United States Patent
Lancon et al.

(10) Patent No.: US 6,647,028 B1
(45) Date of Patent: Nov. 11, 2003

(54) SYSTEM AND METHOD FOR RECOVERING AND RESTORING LOST DATA IN A N-CHANNEL COHERENT DATA TRANSMISSION SYSTEM

(75) Inventors: Emmanuel Lancon, Nice (FR); Clement Yvon Gustave Poiraud, Cagnes sur Mer (FR); Edward Stanley Suffern, Chapel Hill, NC (US); Spiros Joseph Teleoglou, Raleigh, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/157,743

(22) Filed: Sep. 21, 1998

(30) Foreign Application Priority Data

Sep. 30, 1997 (EP) .............................. 97480066

(51) Int. Cl.[7] .................................. H04J 3/04
(52) U.S. Cl. .................. 370/535; 370/542; 370/519; 370/216
(58) Field of Search ................. 370/300, 474, 370/476, 345, 442, 441, 480, 498, 499, 503, 216, 217, 218, 225, 486, 533, 534, 535, 536, 537, 538, 515, 519, 228, 231, 394, 539

(56) References Cited

U.S. PATENT DOCUMENTS

| | | | |
|---|---|---|---|
| 4,394,758 A | | 7/1983 | Donne |
| 4,394,759 A | | 7/1983 | Delle Donne |
| 4,417,348 A | | 11/1983 | Abbruscato |
| 4,458,356 A | | 7/1984 | Toy |
| 4,630,286 A | | 12/1986 | Betts |
| 4,675,886 A | | 6/1987 | Surie |
| 4,734,920 A | | 3/1988 | Betts |
| 4,744,095 A | | 5/1988 | Cornet et al. |
| 4,775,987 A | | 10/1988 | Miller |
| 4,818,995 A | | 4/1989 | Takahashi et al. |
| 5,164,938 A | * | 11/1992 | Jurkevich et al. ........... 370/231 |
| 5,251,210 A | * | 10/1993 | Mann et al. ................. 370/519 |
| 5,452,286 A | * | 9/1995 | Kitayama .................... 370/228 |
| 5,479,608 A | * | 12/1995 | Richardson ............ 395/182.02 |
| 5,548,579 A | | 8/1996 | Lebrun et al. |
| 5,793,983 A | * | 8/1998 | Albert et al. ................ 370/225 |
| 5,815,492 A | | 9/1998 | Berthaud et al. |
| 5,875,192 A | * | 2/1999 | Cam et al. ................... 370/474 |
| 5,923,667 A | * | 7/1999 | Poiraud et al. ............. 370/515 |
| 5,970,067 A | * | 10/1999 | Sathe et al. ................. 370/394 |
| 6,011,776 A | | 1/2000 | Berthaud et al. |
| 6,011,804 A | | 1/2000 | Bertin et al. |
| 6,026,098 A | * | 2/2000 | Kamoi et al. ............... 370/539 |
| 6,118,791 A | | 9/2000 | Fichou et al. |
| 6,134,246 A | * | 10/2000 | Cai et al. .................... 370/474 |
| 6,163,543 A | | 12/2000 | Chin et al. |
| 6,202,114 B1 | | 3/2001 | Dutt et al. |
| 6,205,142 B1 | * | 3/2001 | Vallee ........................ 370/394 |
| 6,219,739 B1 | | 4/2001 | Dutt et al. |
| 6,317,433 B1 | | 11/2001 | Galand et al. |

* cited by examiner

Primary Examiner—Dang Ton
Assistant Examiner—Phuc Tran
(74) Attorney, Agent, or Firm—Cesari and McKenna, LLP

(57) ABSTRACT

A method and apparatus for use where an incoming high speed data stream is first divided into N lower bandwidth channels and is then transmitted through the network to a receiver where it arrives with varying delays depending on the physical characteristics of the network. The high speed data stream is reconstructed by determining the different geographical delay parameters among the lower speed channels, by adjusting the transmission delays by alignment circuitry, and then by combining the lower speed signals into one high bandwidth channel. When one of the lower speed channels fails, the bandwidth is automatically re-adjusted using the remaining N−1 lines. When the failed channel is restored to an acceptable level of service, the communication protocol automatically re-adjusts the bandwidth to the full N channels. When the network indicates the loss of a line, the multiplexers at both ends of the link automatically compensate for the loss without any message exchange. When the line is restored, the multiplexers at both ends of the link automatically re-adjust the bandwidth.

41 Claims, 17 Drawing Sheets

SYSTEM AND METHOD FOR RECOVERING AND RESTORING LOST DATA IN A N-CHANNEL COHERENT DATA TRANSMISSION SYSTEM

TECHNICAL FIELD

The present invention relates to high speed synchronous communication networks and more particularly to a system and method for detecting a failure on one or more among N physically separate telecommunication lines and then for automatically re-adjusting the available user bandwidth to efficiently utilize the remaining operational telecommunication lines.

BACKGROUND ART

The present communication carrier networks have evolved over time from data transmission using mostly analog techniques into entirely digital networks. New industry standards for the transmission and the reception of data have emerged including among other things, methods for channelization, data multiplexing and demultiplexing, switching and cross-connection routing of data from one user to another . . . . The CCITT standards specify data signal voltage levels and template characteristics, framing formats, clocking and signal jitter characteristics. They allow the different manufacturers to connect their equipment to the carrier networks and to inter-operate with each other. In the United States, said standards have been, in particular, the object of a large number of patents relative to clock recovery, alignment and synchronization within a single channel:

U.S. Pat. No. 4,394,758, "Timing circuits for PCM reception"—Donne et al.
U.S. Pat. No. 4,394,759, "Digital information transmission system"—Donne et al.
U.S. Pat. No. 4,417,348, "Digital channel protection switching for radio communications"—Abbruscato et al.
U.S. Pat. No. 4,458,356, "Carrier wave restoration circuit for receiver"—Toy et al.
U.S. Pat. No. 4,630,286, "Multiple telephone circuit synchroniser for high speed data"—Betts et al.
U.S. Pat. No. 4,675,886, "Frame synchronising unit with word-locking decoder"—Surie et al.
U.S. Pat. No. 4,734,920, "High speed modem for multiple communication"—Betts et al.
U.S. Pat. No. 4,744,095, "Diversity channel switch with automatic data rephasing"—Cornet et al.
U.S. Pat. No. 4,775,987, "Transmitter for high bit rate data over telephone system"—Miller et al.
U.S. Pat. No. 4,818,995, "Parallel transmission system using step as line coding type"—Takasaki et al.

Standardization, while useful, is sometimes not cost effective because the granularity of bandwidth to the user does not always meet his needs. The user must reserve bandwidth in the increments tariffed by the individual countries. If a higher bandwidth is required than provided by a given type of channel, the user is forced to buy the next higher increment of bandwidth even though the tariffed bandwidth far exceeds his requirement. For example, in Europe, a user requiring more than the E1 bandwidth of 2 Mbps is forced to buy E3 bandwidth of 34 Mbps. A user in the US requiring more than T1 bandwidth of 1.544 Mbps is forced to buy T3 bandwidth of 44.736 Mbps.

Other patents in the field of interest deal with combining a number of low speed transmission lines to provide a higher bandwidth to the user without the need to "jump" to the next tariffed level of bandwidth service.

U.S. Pat. No. 5,251,210 entitled "Method and Apparatus for Transforming Low Bandwidth Telecommunications Channels into a High Bandwidth Telecommunications Channel"—Mann et al discloses a method and system for combining lower bandwidth channels to produce a higher bandwidth channel.

European patent application 96480090.8 (U.S. patent application Ser. No. 807496) entitled "System and Method for creating N-times E1/J1 bandwidth from N separate physical E1/T1 lines"—Poiraud et al—describes a system and method for aggregating data on multiple physically separate lower-speed E1/J1 channels to generate a higher bandwidth. The high speed data stream is first divided into lower bandwidth channels and then transmitted through the network. The previously divided data stream arrives with varying delays depending on the physical characteristics of the network. Low bandwidth channels are aggregated together into a high bandwidth channel by determining the different geographical delay parameters among the lower speed channels, adjusting the transmission delays by alignment circuitry, and then combining the lower speed signals into one high bandwidth channel for the user. The method for the delay adjustment consists in adding a pseudo-random noise pattern to each of the lower bandwidth channels, measuring the time difference among all the channels, and then adjusting the time differences in the received data stream so that the combination of the signals produces a coherent higher bandwidth data stream. This application is an improvement of U.S. Pat. No. 5,521,210 adapted to the European telecommunication environment.

However, the field of these patents is limited in scope because they do not disclose any error recovery or bandwidth adjustment mechanism in case one of the lower bandwidth channels becomes inoperative.

It is therefore the object of the present invention to provide a method and system for detecting a failure on one or more among N physically separate telecommunication lines and then for automatically re-adjusting the available user bandwidth to efficiently utilize the remaining operational telecommunication lines. It is also the purpose of this invention to allow the user to buy a service using N+1 physical lines and to use N physical lines for normal data transmission with the possibility to replace a failing line with the spare line if one line becomes unusable.

When a high bandwidth data stream, multiple of lower bandwidth channels, is separated into N separate physical data streams according to the method claimed in the aforementioned U.S. Pat. No. 5,251,210 and European Patent application 96480090.8 (U.S. patent application Ser. No. 807496) data are transmitted over different physical paths and are received with different delays among the N physical lines. The aforementioned inventions take into account the different delay characteristics of the different physical lines. The object of the present invention is to continuously detect line status and adjust the bandwidth so as to provide the maximum bandwidth available if one of the physical lines becomes unusable and also to detect and adjust the bandwidth if the previously unusable line becomes usable once again.

The alignment of lower bandwidth data into a higher bandwidth operates by using some of the bandwidth of each lower bandwidth channel as a common timing signal. Each lower bandwidth signal is transmitted to the network with identical timing information. At the destination, the timing information is recovered for each signal independently and is used to recombine the low bandwidth signals into a single high bandwidth signal. The term for this process is to cohere the output from the network into a high bandwidth signal. This process is briefly described below since knowledge of this technique is necessary for understanding how to detect and adjust bandwidth when one of the physical lines becomes unusable.

The timing information is a "superframe" signal added into one bit position of each lower bandwidth channel frame. The effective bit rate of each constituent link is thus reduced, but not significantly. For example, the bit rate of N cohered E1 links is N×1976 kbps versus the available bandwidth of 1984 kbps. The T1 or J1 bit rate is reduced to 1536 kbps from 1544 kbps. The "superframe" signal is a pseudo-random noise sequence from a shift register generator. The auto-correlation properties of pseudo-random noise sequences make them ideal for such timing purposes.

At the source, the same bit of the pseudo-random noise sequence is inserted on each line. These pseudo-random noise sequences inserted on each transmission line are used at the destination to align the data received from the network. At the destination, pseudo-random noise sequence receivers independently acquire the phase of the timing information in each physically separate signal. However, since separate physical paths are used for the transmission of the data, the data at the receiving end is not in the same data-bit sequence as the data that was transmitted at the source. These differential delays between the physical channels can be resolved by using the difference in superframe phases. This function can be accomplished because the transmitting end inserted the receive alignment signals in the same bit position relative to the superframe signals in the data stream (Superframe signals are used by the network to ensure that all user data remains in the same relative time position to a common reference point i.e. the superframe signal.). The process of determining the relative time position of user data to a common reference point and then compensating for this time difference is called coherence throughout in this application. Based on the measured time differences between the superframe signal and the pseudo-random noise bit in the data stream, the relative delay across all the channels can be determined. This delay variance is then compensated for and the low bandwidth channels combined to receive data effectively as a single high bandwidth channel.

When one or more of the physically separate lines becomes inoperative, the transmitted data is no longer received on the inoperative line and the entire data stream cannot be reassembled correctly. Therefore, the whole bandwidth is lost even though N−1 of the physically separate lines are still usable. This impacts the cost of the lines plus the time the user is without any form of data transmission.

SUMMARY OF THE INVENTION

The present invention discloses a technique for detecting a failure on one or more among a N physical lines and for automatically compensating for this loss by using the available bandwidth of the remaining N−1 operational lines. This is accomplished by specific detection and automatic realignment functions. When a receiving end framer in one of the multiplexers at both ends of the physical lines has detected a loss of alignment, high error rates or the loss of a physical line, the bandwidth is automatically re-adjusted with the remaining lines. When conditions on a line are marginal e.g. high error rates, a communication protocol between the transmitting and receiving ends of a line determines if the error rate is too high for the required service and, thereby triggers the automatic adjustment of the bandwidth to N−1 times the number of available lines. When the channel is restored to an acceptable level of service, the communication protocol automatically re-adjusts the bandwidth to the full N channels. When the network indicates the loss of a line, the multiplexers at both ends of the link automatically compensate for the loss without any message exchange. When the line is restored, the multiplexers at both ends of the link automatically re-adjust the bandwidth.

More particularly, the present invention relates to a method and system for readjusting bandwidth in case of failure on one or more among a plurality of low bandwidth channels in a system in a communication network for disassembling a relatively high bandwidth datastream into a plurality of relatively low bandwidth datastreams each having a plurality of data frames, which are transmitted on said corresponding plurality of relatively low bandwidth channels, said disassembling system carrying out the steps of:

dividing said high bandwidth datastream into a plurality of relatively low bandwidth datastreams each having a plurality of data frames;

concurrently inserting an alignment signal into each corresponding data frame of each of said relatively low bandwidth datastreams; the consecutive alignment signals in data frames of each of said relatively low bandwidth datastreams constituting a pre-determined alignment pattern;

concurrently transmitting a respective one of said low bandwidth datastreams including the concurrently inserted alignment signal on a respective one of said relatively low bandwidth channels;

said method comprising the steps of:

detecting a failure on one or more among the plurality of relatively low bandwidth channels;

inserting a failure signal in the data frames of the relatively low bandwidth datastream corresponding to the failing low bandwidth channel, consecutive failure signals constituting a predetermined failure bit pattern recognizable by a system for assembling a relatively high bandwidth datastream from a plurality of relatively low bandwidth datastreams;

replacing in the data frames of the relatively low bandwidth datastream corresponding to the failing low bandwidth channel the alignment signal by a failure signal, consecutive failure signals constituting a predetermined failure bit pattern; recognizable by a far end system for assembling a relatively high bandwidth datastream from a plurality of relatively low bandwidth datastreams;

transmitting the relatively low bandwidth datastream corresponding to the failing low bandwidth channel with the inserted failure pattern; and dividing and transmitting the high bandwidth datastream over the remaining available low bandwidth channels.

DESCRIPTION OF THE PREFERRED EMBODIMENT

Principles

The basic operation of combining lower bandwidth lines into one higher bandwidth line will be described in the following sections. These sections provide the background for describing the technique, object of the invention, for automatically compensating for the loss of one physical line.

Telecommunications Multiplexor Hierarchy

The hierarchy of multiplexors used in different parts of the world is shown below:

| | PCM Hierarchies | | | | | |
|---|---|---|---|---|---|---|
| | North American | | Japanese | | CCITT CEPT | |
| Order | Bit Rate Mbps | No of Channel | Bit Rate Mbps | No of Channel | Bit Rate Mbps | No of Channel |
| Single Channel | 64 kbps | 1 | 64 kbps | 1 | 64 kbps | 1 |
| First order | 1.544 | 24 | 1.544 | 24 | 2.048 | 30 |
| Second order | 6.312 | 96 | 6.312 | 96 | 8.448 | 120 |
| Third order | 44.736 | 672 | 32.064 | 480 | 34.368 | 480 |
| Fourth order | 274.176 | 4032 | 97.728 | 1440 | 139.274 | 1920 |
| Fifth order | | | 397.200 | 5760 | 564.992 | 7680 |

Figure 1:
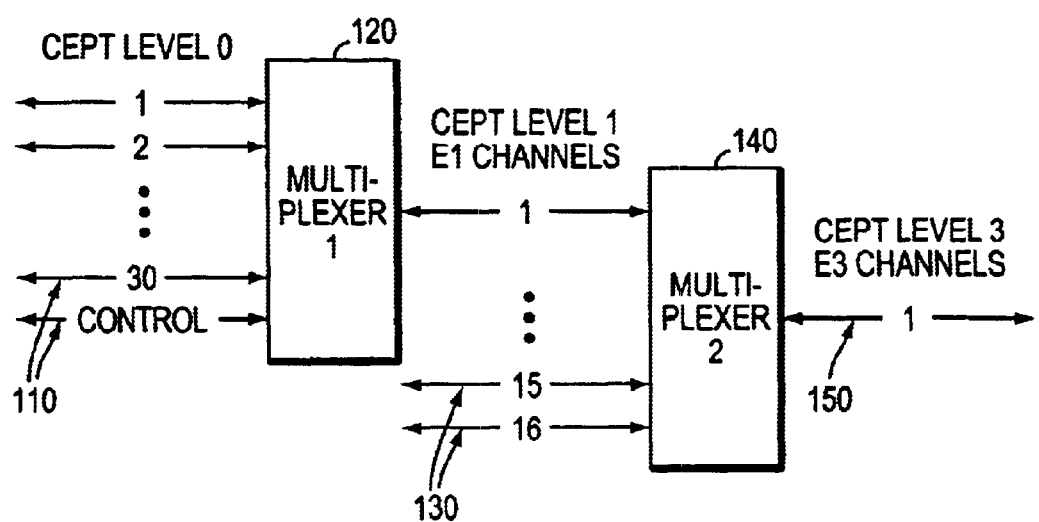
FIG. 1 depicts a typical telecommunications network hierarchy.

The different multiplexing techniques can be used within one another. FIG. 1 depicts a typical use of multiplexors in cascade. A number of low speed 64 kbps channels (110) are combined by a carrier's multiplexor (120) into one high speed E1 line (130) operating at 2048 kbps. This includes 1920 kbps of user data and 64 kbps of network signalling information required in the network standard. The remaining 64 kbps is used by the network equipment for frame and superframe synchronization and for network management of the network. The resulting combination (130) comprises: 30 users channels (110) (30-times 64 kbps); one control channel (110) used for signalling (64 kbps); and one network channel added by the network equipment multiplexer (140) used for frame synchronization (64 kbps).

Figure 4:
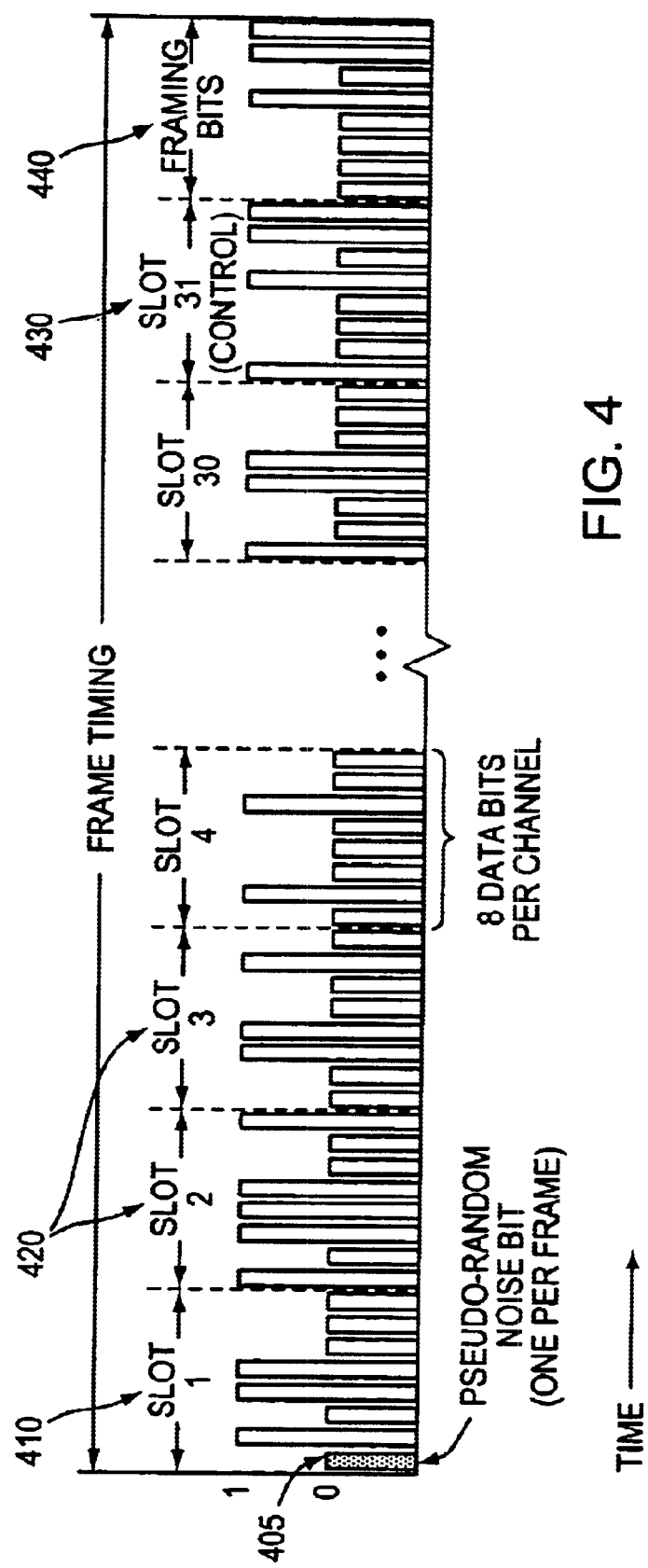
FIG. 4 shows a frame structure.
Figure 5:
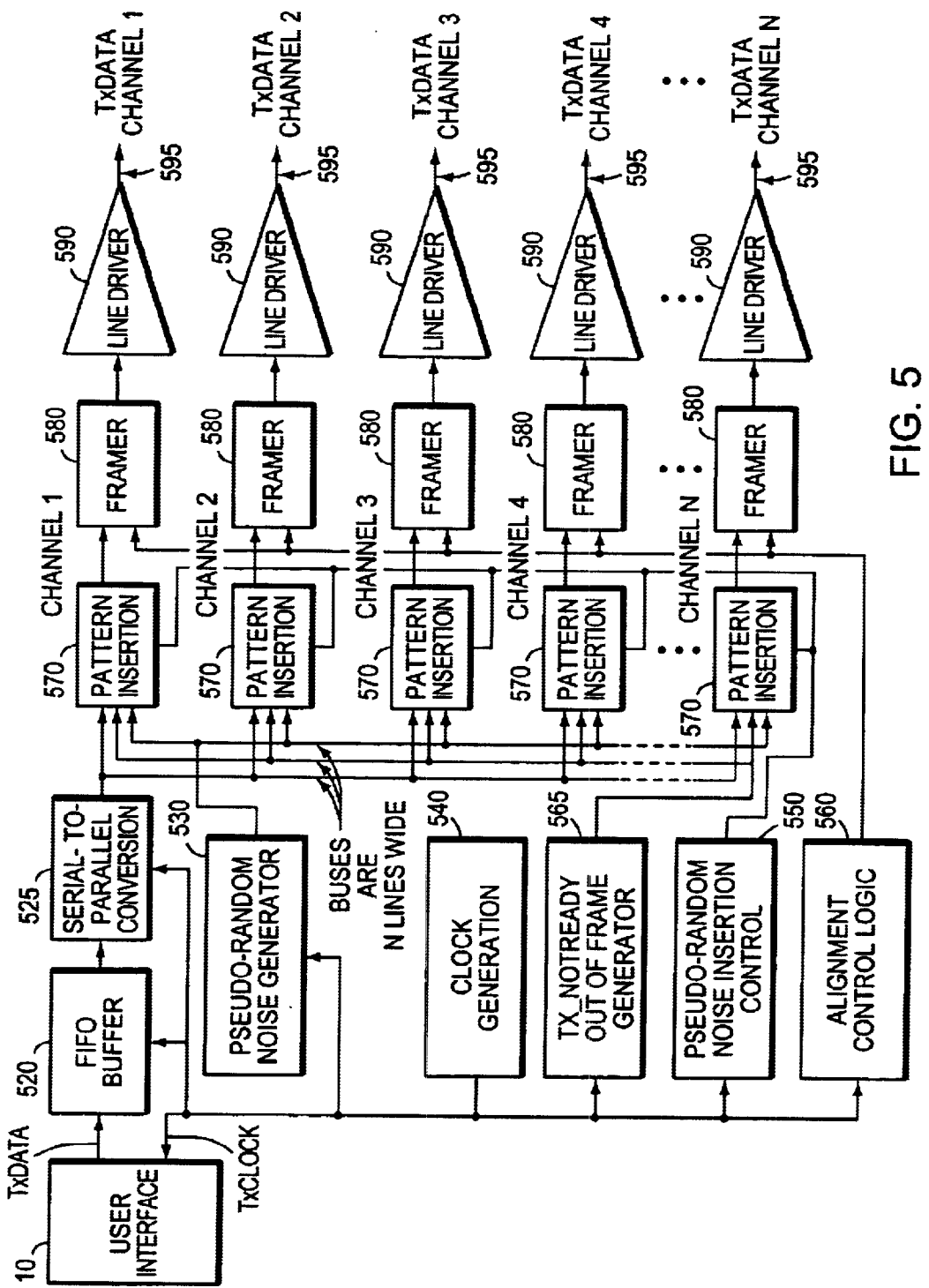
FIG. 5 shows the transmit disassembling system according to the present invention.

The effective user bandwidth available is 1920 kbps. Added to these channels (110) is a control channel for signalling. The multiplexor (120) adds a network channel for allowing the telecommunications equipment to identify each channels' position within the E1 line. This bandwidth comprises the CEPT level 1 E1 channel (130) for the next level multiplexor (140). FIG. 4 depicts the same scenario as related to a time sequence. The pattern of 256 bits transmitted in 125 microseconds is a repetitive pattern within the network resulting in a bandwidth of 2048 kbps. Data is divided into 30 eight-bit channels (410) and (420). The control channel (430) is reserved in the data stream for signalling purposes. The sum of 30 data channels and one signalling channel at 64 kbps is 1984 kbps. The network framing pattern (440) is added to each frame to allow the transmission equipment in the network to maintain frame synchronization and therefore know the relative position of each of the user's data within the frame. The addition of this information brings the total network bandwidth to 2048 kbps.

Various types of combinations with varying amounts of user bandwidth are available within the network. This standard has been designated as the $H_x$-series standards for E1. The multiplexing (140) by the telecommunications carrier of sixteen E1 lines together (130) forms one E3 telecommunication connection (150) operating at 34368 kbps.

BACKGROUND

The following background relates to the technique of assembling and disassembling a high bandwidth signal from and into a plurality of lower speed physical channels. This background is necessary for understanding the error recovery mechanism.

Bandwidth Granularity

The use of E1/J1 channels for transporting user data through the European and Japanese telephone networks is well-established. The North America provides a similar service with T1 lines. Many commercial products do this today. The limitation of this technology is that the maximum user bit rate available is only 1984 kbps in Europe (the E1 bit rate 2048 kbps minus the framing overhead 64 kbps), or 1536 kbps in North America (the T1 transmission rate 1544 kbps minus the bit synchronization and alignment bits).

Figure 2:
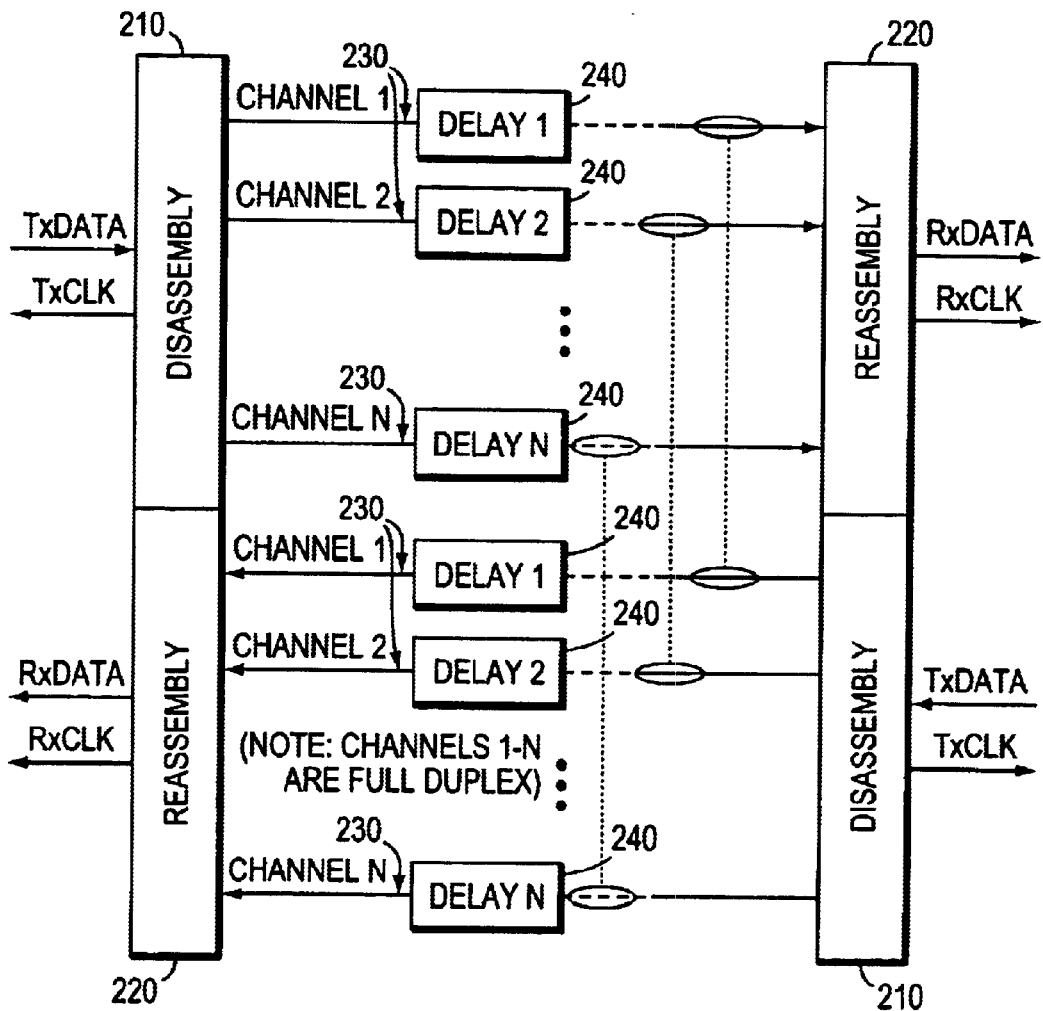
FIG. 2 shows an overview of the disassembling and reassembling process.

The system described in European patent application 96480090.8 (U.S. application Ser. No. 807496) receives data from a single user at a rate N-times that of a lower bandwidth line, in the example an E1 line (130). (Note that U.S. Pat. No. 5,251,210 deals with a similar mechanism for the U.S. networks). Referring to FIG. 2, user data is transmitted from a disassembling system (210) to a reassembling system (220) as full duplex data in the form of serial data streams labelled TxDATA and RxDATA. The data is accompanied by network clocks labelled TxCLK and RxCLK. Before being transmitted over the carrier network, the data is divided (210) into N lower speed serial data channels (230). After transmission, the data received from the multiple N channels (230) is reassembled (220) into a continuous data stream resulting in the reception of data identical to the data transmitted. The problem raised in European application 96480090.8 (U.S. application Ser. No. 807496) is that the lower speed channels (230) may have different delay characteristics (240) because: the channels are physically different, the equipment along the transmission path are different, the routes within the network are different.

Frame Structure

As shown in FIG. 4, user data is placed in slots 1 to 30(420) of the frame. (All the slots can be used contiguously so the system has one single user occupying all the bandwidth available). The last slot (430) is used for framing and control purposes and the first (MSB) bit (405) of the first slot (410) of every frame is used at the receiving end to determine the delay characteristics of each physical link. Because the invention requires use of one bit of the user's data stream, the user's bandwidth is slightly less than the total available bandwidth. A data pattern is inserted in the bit at the transmitting end so that the receiving end can search the data stream and determine when the hardware has detected the data pattern in this bit position. A pseudo-random noise sequence of length 511 (9 bits) as defined by the CCITT is written into this timing bit (405). Exactly the same pseudo-random noise sequence bit (405) is written into this bit position for each N frame in the same group of telecommunication lines. User information is then placed in the remaining seven bits of the first channel (410) and also in the remaining channels (420). The user is unaware that one bit of his data stream is being used for determining the delay characteristics of the telecommunications line. The timing to the end user is adjusted to take this slight variance into account and no user data is lost.

Cohering Mechanism

Figure 7:
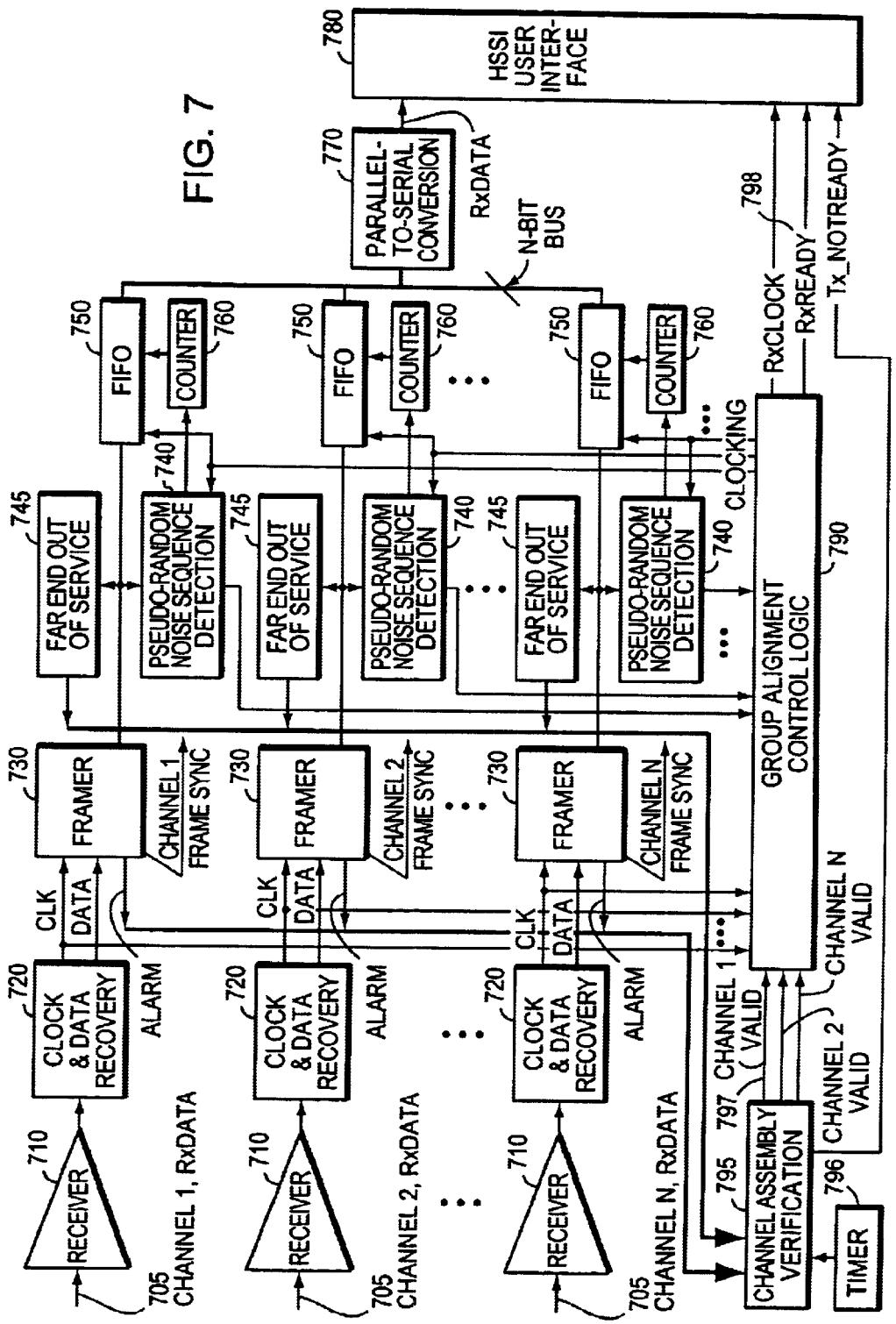
FIG. 7 shows the receive reassembling system according to the present invention.

As illustrated in FIG. 7, the cohering mechanism at the receiving side requires, for each channel, a Framer (730) for detecting the network framing pattern associated with a Pseudo-Random Noise Sequence Detector (740) for determining the position of one data stream relative to another; and an Elastic Buffer (actual implementation uses a FIFO buffer) (750) for compensating the delay of the different paths used in the network.

At the start of the cohering operation, all N Pseudo-Random Noise Sequence Detectors (740) are searching for the pseudo-random noise sequence. During this time no data is loaded into the FIFO Buffers (750). Once the Pseudo-Random Noise Sequence Detectors (740) have detected the pseudo-random noise sequence (one pseudo-random noise bit from 511 consecutive frames), they are said to "lock" onto the pattern. Each channel locks onto their incoming pseudo-random noise sequences independently. After all N pseudo-random noise sequence Detectors (740) come in-lock, the differences in delays can be determined. Once the differences in delays are determined, the FIFO Buffer (750) can be used to compensate for this delay. Then the outputs can be cohered in the FIFO Buffer (750) into a single high bandwidth data stream.

Figure 3:
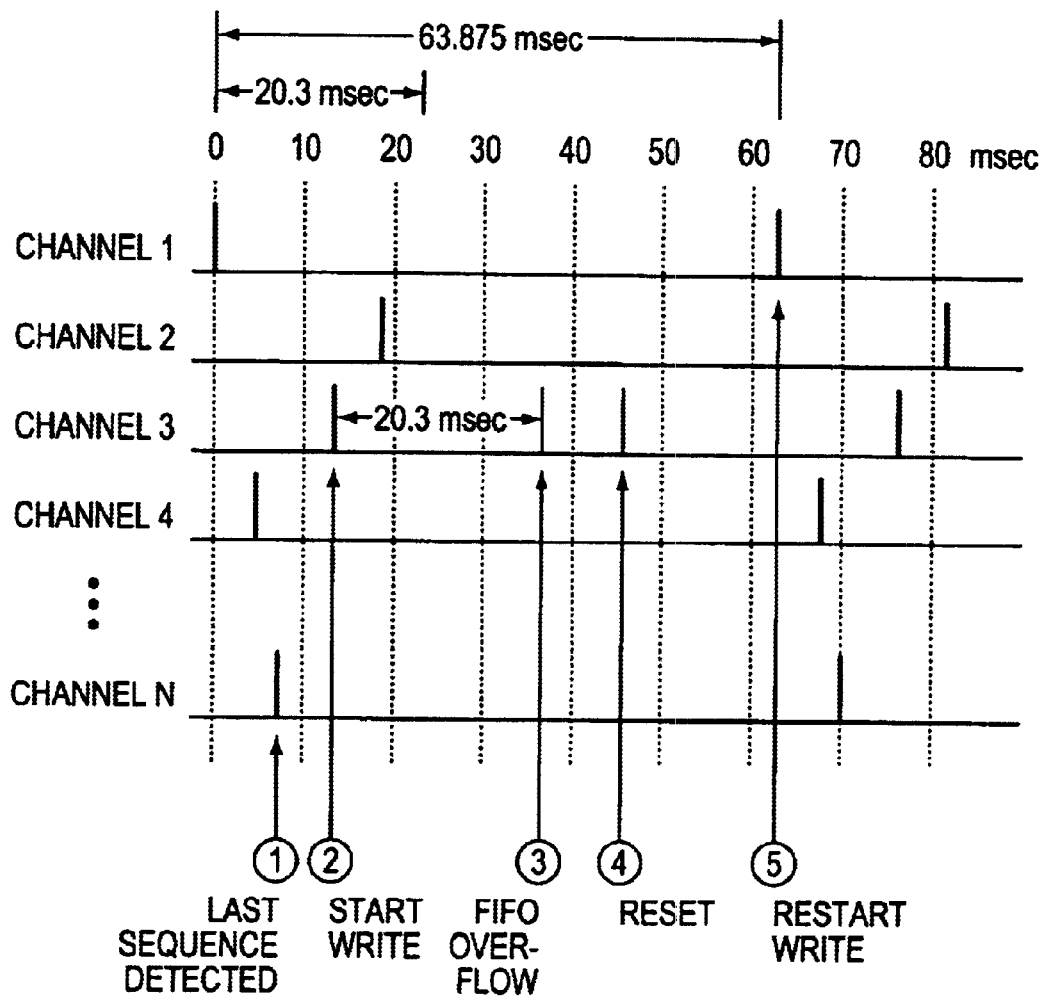
FIG. 3 shows a typical sequence of operation for starting the process of aligning the data with different delay characteristics.

FIG. 3 shows a typical sequence of operations on starting coherence. Last in-lock: there is no way to know what the absolute delay of the N incoming lines is. Hence the last pseudo-random noise codes to become in-lock may not, in general, be that one having the longest delay (1). Any of the N may be last.

Start Write: the FIFO Buffer (750) writes start when that particular channel has detected the 511 bits of the pseudo-random noise sequence. The write to the FIFO Buffer (750) might start with channel 3 (2), which is in the middle of the high bandwidth data stream. FIFO Buffer writes then start for a channel 2, following its pseudo-random noise start of sequence bit.

FIFO Overflow: no more writes occur for over 20.3 msec. This causes the FIFO Buffer (750) of channel 3 (3) to overflow.

Reset: upon the FIFO Buffer (750) overflow, all N FIFO Buffers (750) are reset (4). The window of 20.3 msec ensures that the other N-1 channel have had time to enter data bytes in the other FIFO Buffers (750) if proper coherence is occurring. The fact that they have not started to write indicates that proper coherence is not being obtained, and the mechanism resets. (Reset must be done from between 20.3 msec to 63.9 msec to ensure that it can been done and is removed before the start of the next pseudo-random noise sequence. The 20.3 msec figure is caused by the length of the FIFO Buffer of 32,768 bits and the 63.9 msec figure is caused by the number of bits in the pseudo-random noise sequence.)

Restart Write: after reset which may be done because the network is in an error condition, the receive reassembly process is started again. The Pseudo-Random Noise Sequence Detector (740) is not writing to any FIFO Buffer (750), and is looking for the first start of sequence bit. When this is seen (5), FIFO Buffer (750) writes start. When N first FIFO buffer writes have been done, coherence has been achieved.

As illustrated in FIG. 7, when the first write operation is done into the FIFO Buffer of the last line to see a pseudo-random noise start of sequence bit, a Counter (760) is triggered. The Counter runs for one frame time. When this counter matures, output data reads from all N elastic buffers start simultaneously. This delay operation ensures that there is at least one full frame of data in the shortest elastic buffer before reading starts. This ensures that for any jitter/wander excursion of the links, and the mechanism does not underflow.

Implementation

An overview of the disassembling and reassembling is shown in FIG. 2.

Disassembling System

Before dividing (210) the high bandwidth data stream (TxData) into N low bandwidth channels (230), each of the N channels (230) must have achieved frame synchronization from the framing units (730) in the receive data.

Figure 6:
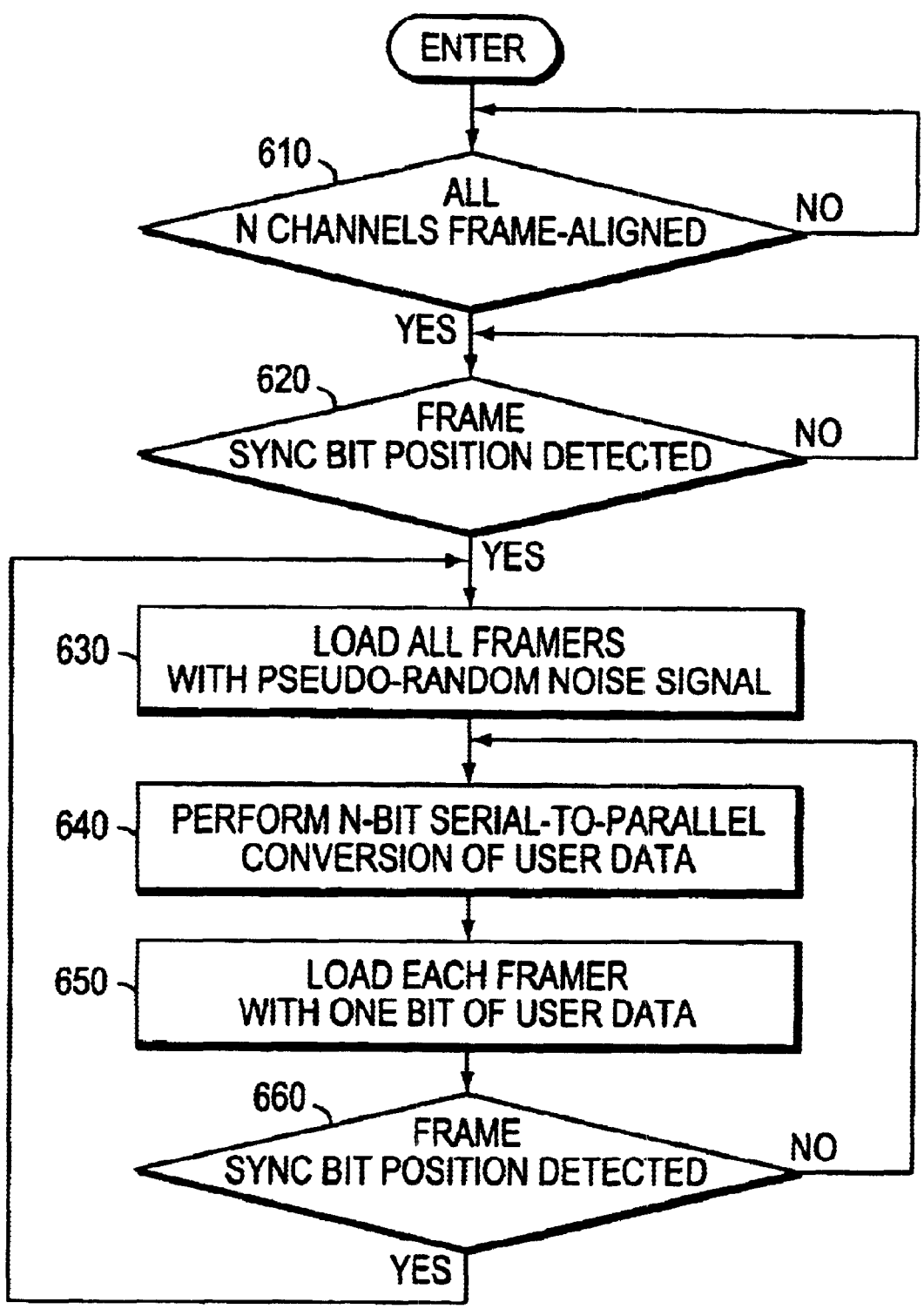
FIG. 6 shows the transmit disassembling process.

The disassembling system is detailed in FIG. 6.

Clock Generation (540): A Clock Generation unit generates a high speed clock (TxClock) with a frequency exact multiple of the low speed clock received from one of the lines. The high speed clock is provided to a user interface called High Speed Serial Interface (HSSI) port (510) for clocking data into the network.

Elastic Buffer (520): The user's incoming data (TxData) enters in bit-serial form on the High Speed Serial Interface port (510) into an FIFO Buffer (520) to compensate for slight variations in clocking.

Serial-to-Parallel Converter (525): Then, the user's data is fed into a Serial-to-Parallel Converter (525) having an N-bit output. The value of N is equal to the number of lines over which the incoming data is transmitted through the network, and hence the bit rate multiplier. The transmitted bit rate is N×1976 kbps.

Pattern Insertion (570): The N bits of the Serial-to-Parallel Converter (525) output in turn form N bit serial inputs to N Pseudo Random Noise Insertion (PRNI) units (570). These PRNI units are bit multiplexers. As the data exits the Serial-to-Parallel Conversion unit (525), the high bandwidth bit stream must be divided into N lower speed bit streams. The PRNI (570) circuit accepts only one of N bits from the higher bandwidth signal. After it accepts one bit, the next PRNI unit accepts the next bit. The Pseudo-Random Noise Insertion Control (550) synchronizes the insertion of the pseudo-random noise bit (405) with the framing pattern (440) in the data stream.

Transmit Pseudo Random Noise Insertion Control Logic (550): The Pseudo Random Noise Insertion (570) units operates under the control of the Transmit Pseudo Random Noise Insertion Control Logic (550).

Framers (580): The outputs of the Pseudo Random Noise Insertion units (570), in turn, are used as inputs to Framers (580).

Alignment Control Logic (560): The Alignment Control Logic (560) maintains the pseudo-random noise sequence bit (405) and determines the bit ordering positions within the frame shown in FIG. 4. This Alignment Control Logic (560) ensures that the Framer 580) inserts eight bits (440) for framing synchronization into each 256-bit frame.

Pseudo Random Noise Generator (530): Of the 248 bits remaining per frame entering the Framer, 247 are data from the incoming data, and one bit is used by the Pseudo Random Noise Insertion (PRNI) unit (570) from the Pseudo Random Noise Generator (530). There is one Pseudo Random Noise Generator (530), and its output is added at a common time into all N data streams. Timing is such that the bit from the PRNI generator (530) is inserted into the first bit position of the first slot (405) on a frame following the framing bit in each frame.

Out-of-Frame Generator (565): The out-of-frame bit sequence TX_NOTREADY is inserted in place of the pseudo-random noise sequence when this channel is out of service. This is to notify the far end multiplexer that the channel is no longer usable.

Line Drivers (590): The Line Drivers (590) are CCITT compliant circuits that place the bit stream in the network (595).

In this manner an identical superframe signal is added into each of the N channels (595), in exactly the same bit position in the frame. This information is used to cohere the received signal.

Disassembling Process

FIG. 6 shows the process for disassembling the high bandwidth user's data in the transmit direction.

Step (610) determines if all the N channels have obtained frame alignment by detection of the frame alignment sequence pattern from the network data stream in the frame and superframe patterns (440).

Once frame alignment has been detected, step (620) searches for the frame synchronization bit (440). The frame synchronization bit starts the initial process of disassembling for the high speed data.

Once the frame synchronization bit is detected, step (630) loads all the Framers (580) with the pseudo-random noise sequence bit (405) provided by the Pseudo Random Noise Insertion unit (570) and the Pseudo Random Noise Generator (530) so the transmitted signal has a common point of reference.

Step (640) performs the serial to N-bit parallel conversion (525) of the data as it is passed to the Framers (580).

Step (650) loads one bit of user data in the Framer (580) and then performs a test.

Step (660) determines if the next bit is going to be the frame synchronization bit denoting the start of a new frame.

If no frame synchronization bit is detected then steps (640) and (650) are executed in a loop until the synchronization bit is detected.

Once step (660) detects the synchronization bit then control is passed to step (630)

In step (630) the pseudo-random noise bit is inserted in the data stream and the process is repeated.

If at any time the signal is lost or frame synchronization disappears because of a network problem, the control passes back to steps (610) and (620) so the synchronization and alignment process can start over.

Reassembling System

The reassembling system is detailed in FIG. 7:

Receiver (710): The signal RXDATA transmitted along each channel (705) is received (710) at its destination point.

Clock and Data Recovery (720): The user's data and the clock are recovered (720) from the received analog signal.

Framer (730): Each analog signal is converted to digital levels and processed by a Framer (730), one for each line. The recovered clocks are used by the Framers in the reassembling and delay compensation process. The Framers search the incoming data stream for the frame alignment sequence that is used to determine the relative positions of the data bits being received as shown in FIG. 4. Framing is done by commercially available Framer devices (730) which use the framing signal contained in the eight bits of each frame (440). The Framer output contains 247 data bits (out of the 248 bits remaining) for each received frame.

Pseudo Random Noise Sequence Detections (740): At the receiver side, the N independent channels (705) contain an embedded pseudo-random noise sequence (405) along with the data Because of the different physical paths that each signal may traverse, the delay of the received data normally varies among received signals. Therefore, there must be some circuitry added to compensate for this delay. On every channel (705) a Pseudo Random Noise Sequence Detection unit (740) searches for the delay of the pseudo-random noise sequence (405) from each incoming signal. Delay is measured in the number of data bits between the pseudo-random noise bit among each data stream. (See FIG. 8 for an example). This sequence of 511 bits is found in the first bit position following the framing slot of every signal (405).

Far End Out-of-Service (745): During normal operation the circuit monitors the pseudo-random noise sequence time slot to determine if and when the far end multiplexer has detected a failing condition on the line. When the far end multiplexer has detected this condition, it send an "out-of-service" bit sequence TX_NOTREADY in place of the pseudo-random noise sequence. The Far End Out-of-Service (745) detects this condition and signals the Channel Assembly Verification unit (795) to drop this channel from the reassembly process.

Channel Assembly Verification (795): The Channel Assembly Verification unit (795) determines the operational status of all incoming channels to be reassembled based on signals from the Far End Out-of-Service (745) and the Pseudo-random Noise Sequence Detection (740) units. From this information the Channel Assembly Verification unit (795) identifies which channels are valid and sends CHANNEL N VALID (797) signals to the Group Alignment and Control Logic (790). Thus, the Group Alignment and Control Logic (790) can direct the Parallel-to-Serial Conversion circuitry (770) to properly assemble the physically separate low speed lines into a high bandwidth data stream.

Timer (796): The Timer (796) is started once a failed line comes back into service. Since the reassembly process is relatively long, it must not be invoked unless the failing has been proven stable for a pre-determined period of time I.e. one second.

Delay FIFO Buffer (750): Once this sequence has begun, then writing into Delay FIFO Buffers (750) begins with the first data bit following the pseudo-random noise sequence which is defined as start of frame. In this manner the bits entering the Delay FIFO Buffers correspond to the bits which were originally associated at the transmitter. However, the bit sequence is still not aligned so that it can be reassembled into the high speed signal that was transmitted at the origin.

Figure 8:
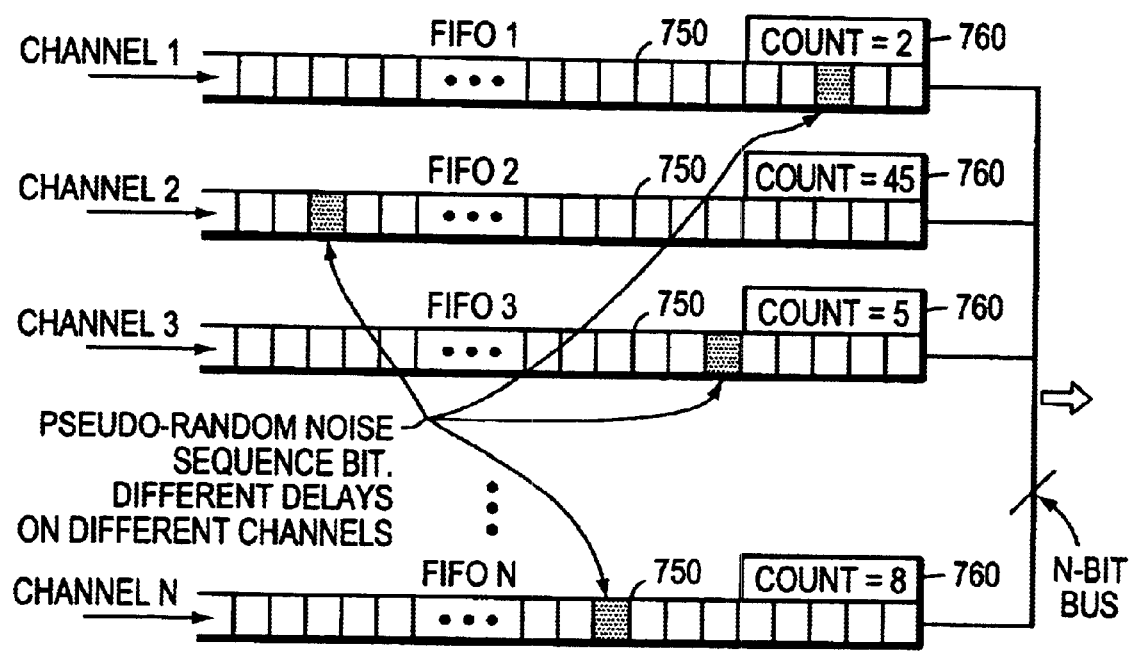
FIG. 8 shows the delay equalization process.

FIG. 8 shows a snap-shot of the Delay FIFO Buffers at a given point in time in the reassembling process.

Counter (760): Each Delay FIFO Buffer (750) contains a Counter (760) that holds the number of clock cycles required to shift the pseudo-random noise sequence to the last position in the Delay FIFO Buffer.

FIG. 8 shows an example of each Delay FIFO Buffer (750) and its associated Counter (760) when all lines have detected the pseudo-random noise sequence (405) in their data stream. The different counter values and the different positions of the pseudo-random noise bit are due to the different delay parameters of the data transmission over N physically separate lines. For the high bandwidth signal to be reassembled this delay must be compensated for.

Group Alignment Control Logic (790): The Group Alignment Control Logic (790) ensures that the N Pseudo Random Noise Sequence Detection units (740) have detected the pseudo-random noise sequence and are "locked" onto that repeating pattern.

Parallel-to-Serial Conversion (770): Once the delay compensation occurs, the outputs of the N Delay FIFO Buffers (750) are read out as an N bit word, reflecting the way they were written in on the transmit side. This word is then converted to bit-serial format (770) and sent out the transmit side of the HSSI port (780).

Reassembling Process

Figure 10A:
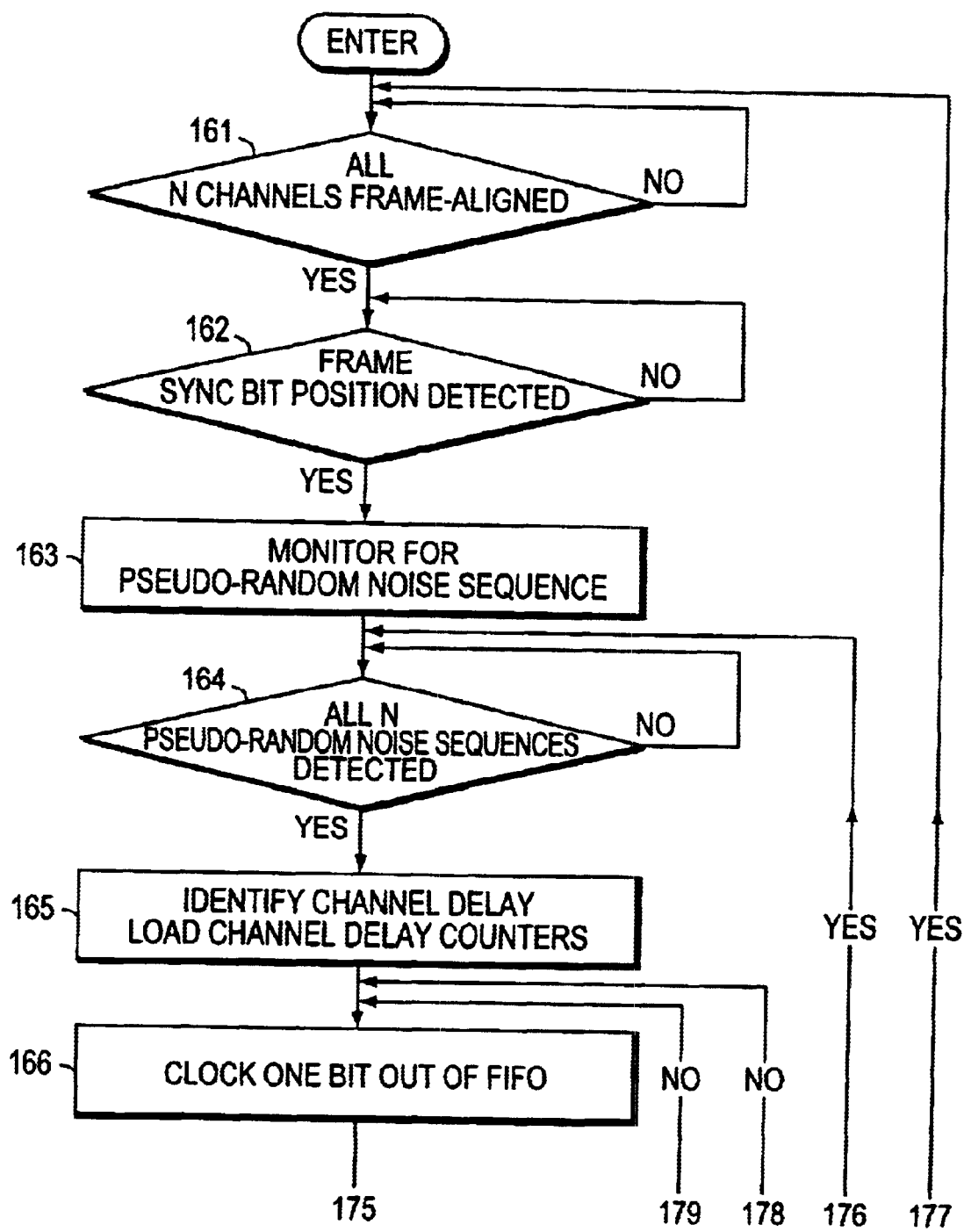
FIGS. 10a and 10b show the receive reassembling process.
Figure 10B:
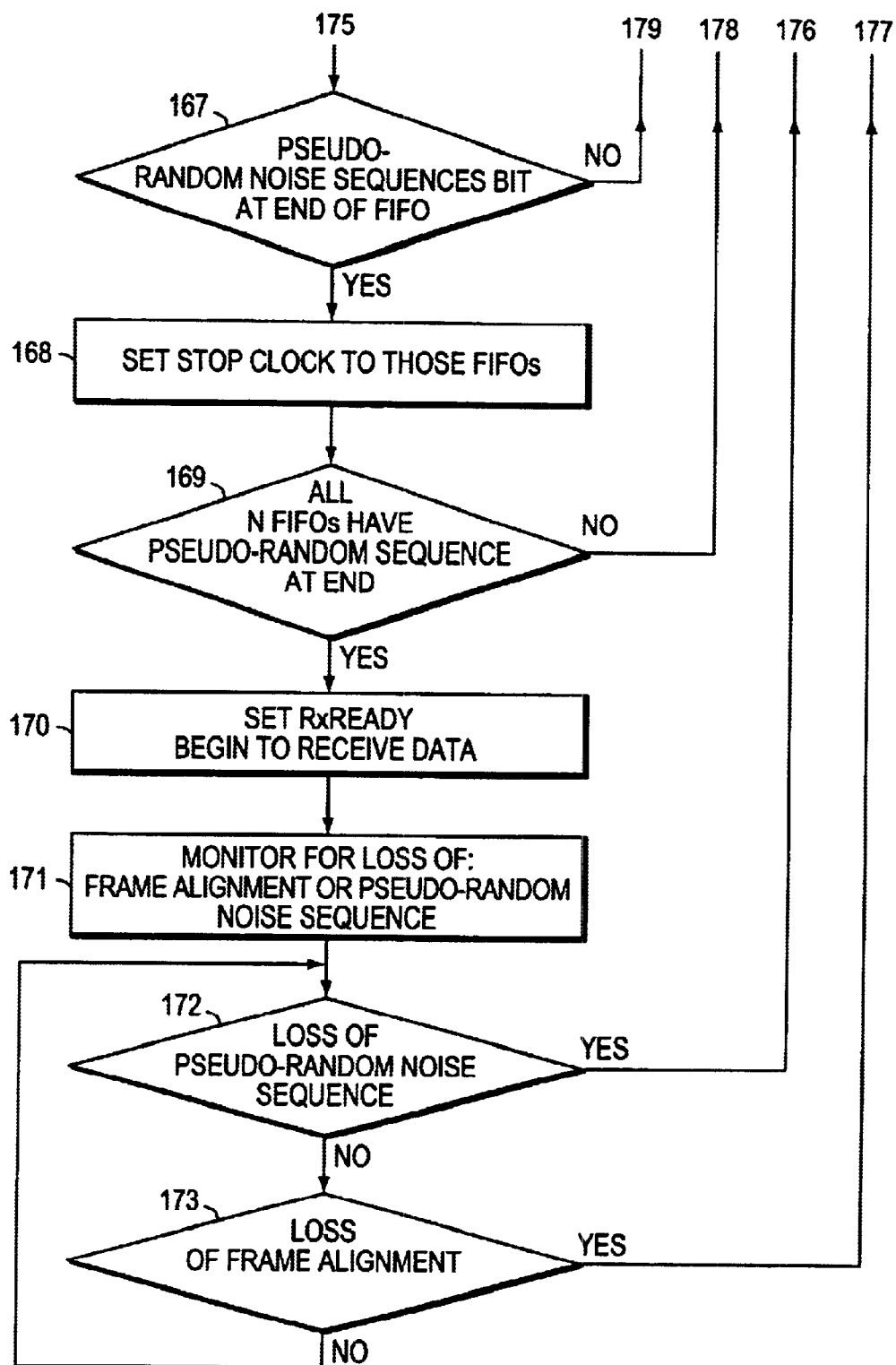
Figure 11:
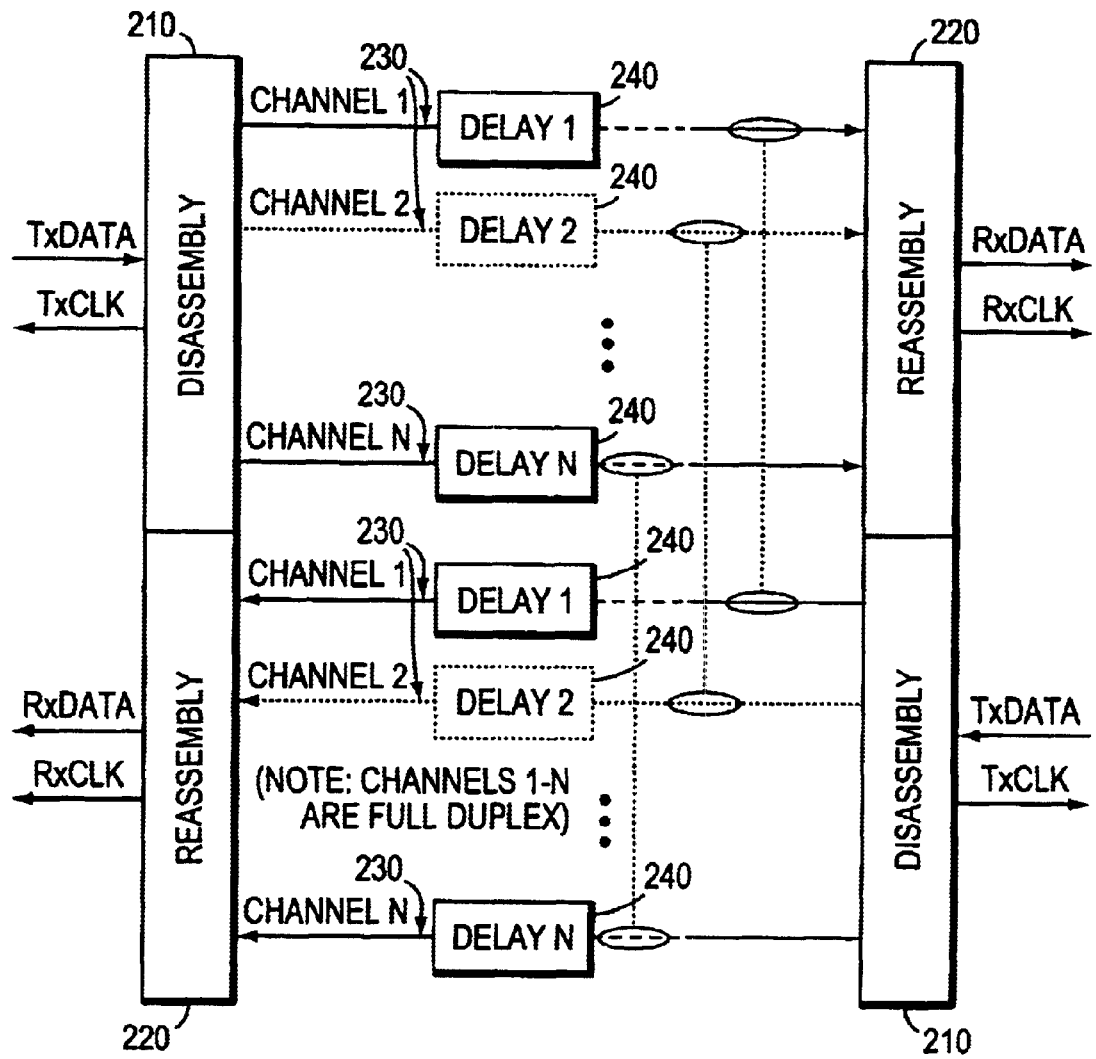
FIG. 11 shows the disassembling and reassembling process according to the present invention with a failure on channel 2.

FIGS. 10a and 10b show the process for reassembling the user's data after reception:

Steps (161) and (162) show the initial process for obtaining both frame alignment and the frame synchronization pattern (440) across all the receive lines. This process is similar to the process for the transmit disassembling process.

Step (163) analyzes the result of the Pseudo Random Noise Sequence Detection units (740) for all the received signals.

Once they have all been detected by the Group Alignment Control Logic (790) as shown by a positive response to step (164), the Counters (760) are loaded by step (165) with the number of cycles occurring after the detection of the framing bit. This Counter (760) for each line holds the delay value for that channel.

Bits are now clocked out of the Delay FIFO Buffer (750) by step (166).

Figure 9A:
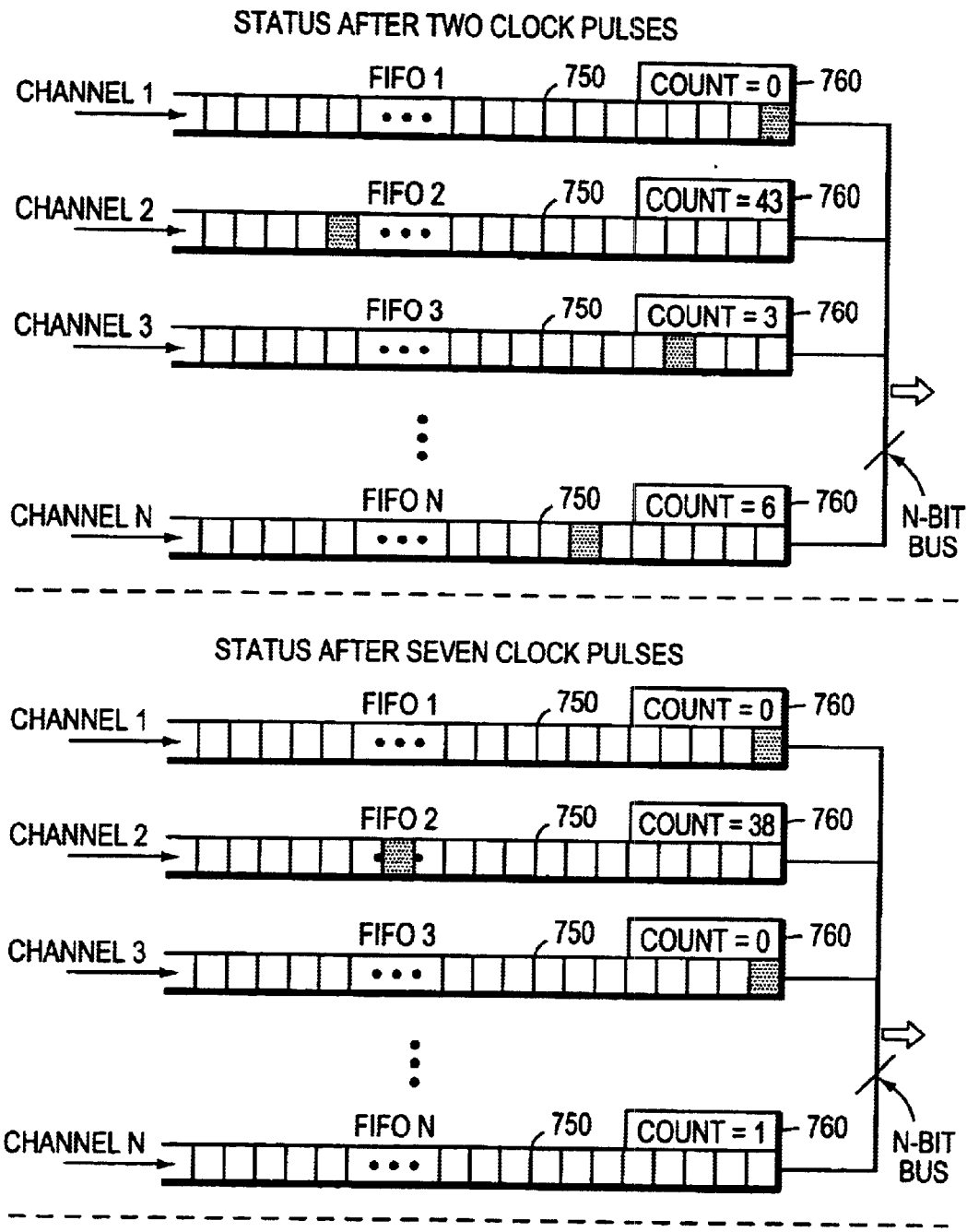
FIGS. 9a and 9b show the delay equalization process after two, seven and forty five clock pulses.
Figure 9B:
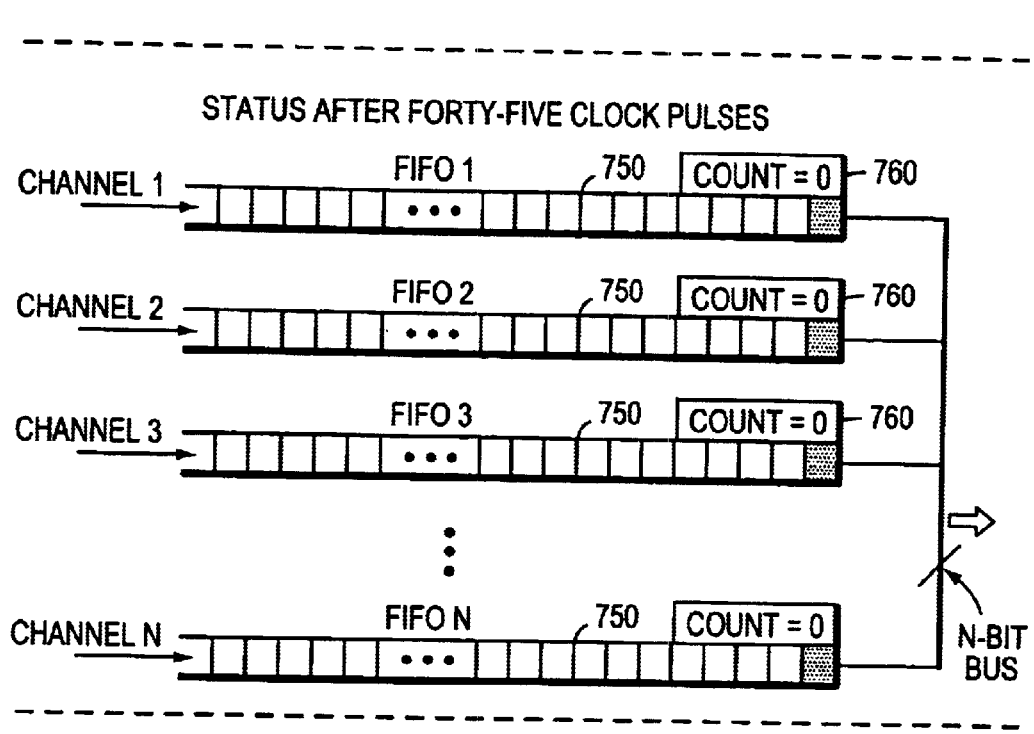

Then step (167) tests the Counter (760) for a zero value indicating that the pseudo-random noise signal bit (405) is now at the head of the Delay FIFO Buffer. Of course some Delay FIFO Buffers will have the pseudo-random noise signal bit at the head of the Delay FIFO Buffer before the others. In this case step (167) is exited with a positive response and step (168) prevents this bit from being clocked out of the Delay FIFO Buffer (750). The sequence of events related to this process is described in FIG. 9.

Step (169) uses the output of the Group Alignment Control Logic (790) to determine when all the pseudo-random noise signals are at the head of the Delay FIFO Buffer (750). When this occurs, the signal is ready to be reassembled into an N-times bandwidth signal.

Step (170) indicates that the reassembly process is finished and that data can now be reassembled from the input data streams. The Group Alignment Control Logic (790) sets a signal RxREADY (798). This indicates to the user that his equipment can begin to receive the reassembled data by step (770) over the HSSI interface (780).

The remaining steps (171), (172) and (173) monitor for any error conditions that may occur within the carrier network. Error conditions that do occur cause the state machine to return to the appropriate state and begin the process once again.

Automatic Compensation for the Loss of a Physical Line

Error Detection

There are various problems that can occur in a network to make one of physical lines unusable in the reassembly process described above. On any transmission line, conditions are such that problems can be defined as minor alarms where communication between end users is still possible, but is not reliable, or major alarms when the transmission line is not usable and no communication is possible between the end users.

Figure 12:
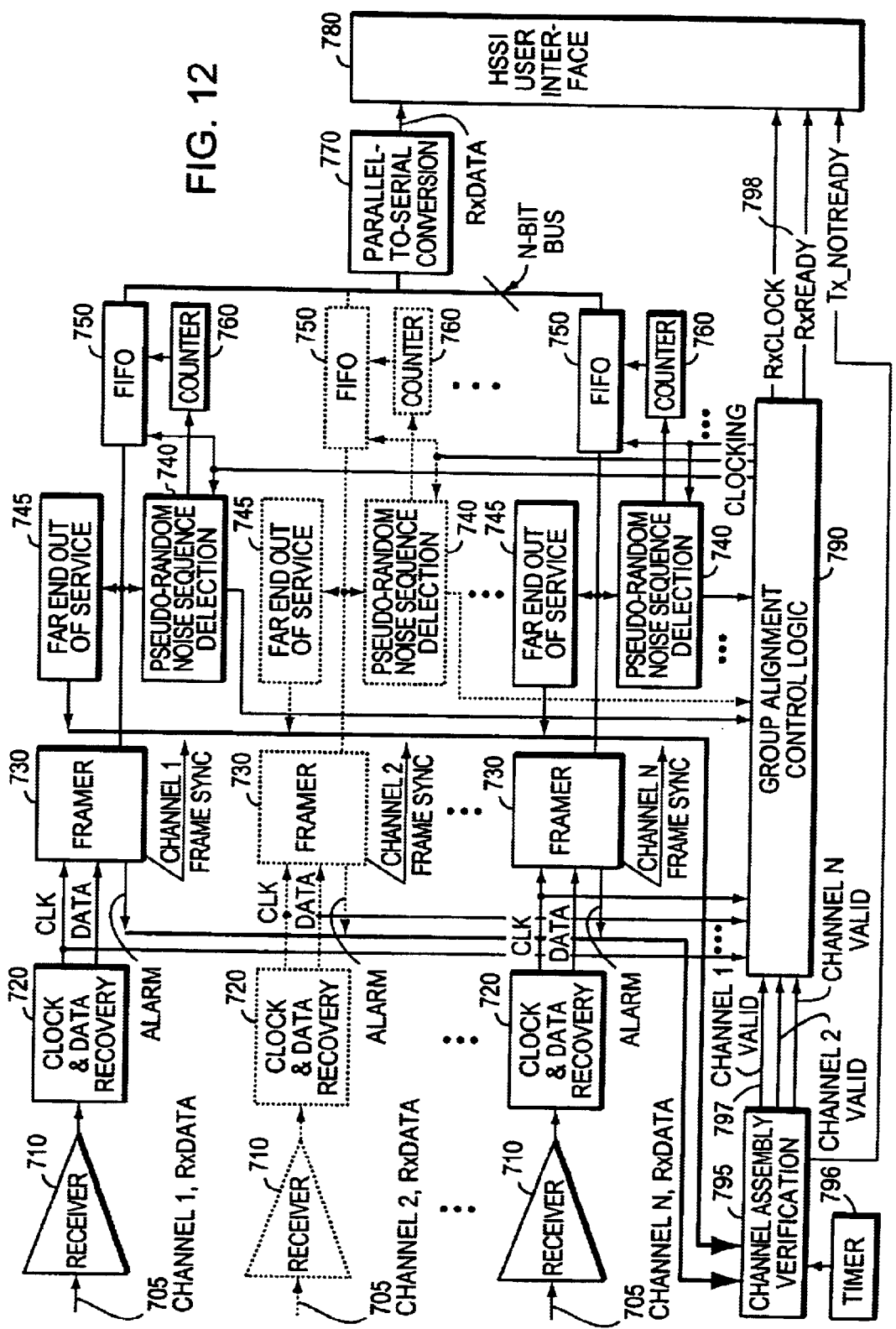
FIG. 12 shows the receive reassembling process according to the present invention with a failure on channel 2.

Some of these problems are detected within the network and signalled to the receiving device with a special pattern of 1's and 0's within the frame synchronization pattern (440) described in FIG. 4. These network errors signals are reported to the receiving end Framers (730) as shown in FIG. 12. Other problems are reported to the receiving end Framers (730) such as loss of synchronization, loss of signal or a high error threshold indication.

The present invention automatically detects the error conditions and adjusts accordingly the available bandwidth. Thus, the entire bandwidth is not lost and the service provided to the end user is ensured continuously without any disruption.

The receiving end Framers (730) automatically monitor the status of each channel and signal the Channel Assembly Verification unit (795) if one or more of the channels should be dropped due to sub-standard performance or detection of a major alarm. Any faulty or sub-standard physical connection point within the network, e.g. physical line between two cities in the network, will "fallback" out of service, until it is subsequently observed to be free from defect and can be restored to service. This service is provided by the network to the end user. The network provides an indication that the link is out of service in the framing bit sequence (405). This framing bit sequence (405) is monitored for and detected by the end Framer (730).

When a line is taken out of service (called a "fallback" condition in the network), the remaining lines are realigned to carry the entire data stream. Since the invention sources the clock to the data terminal equipment, automatic rate throttling is provided. The Group Alignment Control Logic (790) adjusts the RxCLK signal furnished to the remaining lines.

In-Band Signalling

Fallback can be coordinated between the originating and receiving ends of the network by means of in-band signalling in the first time slot (410) of each frame. When a failure indicated by the network as an alarm is detected on one channel, the near end multiplexer substitutes a failure bit pattern (TX_NOTREADY) made up of a specific sequence of bits recognizable by the far end multiplexer in place of the alignment pattern (this failure pattern is only inserted on the failing channel). Because the alarm can be seen only by one end of of the channel, the function of the failure pattern is to inform the far end multiplexer that data communication is no longer reliable and that bandwidth must be adjusted. On the failing channel, instead of inserting a pseudo-random noise sequence by means of the Pseudo-Random Noise Insertion Control Logic (550), the failure pattern is inserted in the frames by means of the Out-of-Frame Generator (565). This failure pattern overrides the normal pseudo-random noise alignment sequence (405) used for alignment, so no additional bandwidth is taken away from the payload. This in-band coordination of fallback/recovery eliminates the need for additional overhead definition at a higher level protocol. The fallback management protocol according to the present invention uses predetermined signals to be transmitted in the first time slot of each frame of the failing channel overriding the normal pseudo-random noise alignment sequence (405).

Minor Alarms

Alarm Detection

The receiving end Framers (730) have 1) a built-in circuitry to detect out of alignment conditions, and 2) an error threshold (e.g. 1 times $10^{-9}$) that indicates the channel is no longer usable because of the high error rate.

Figure 13:
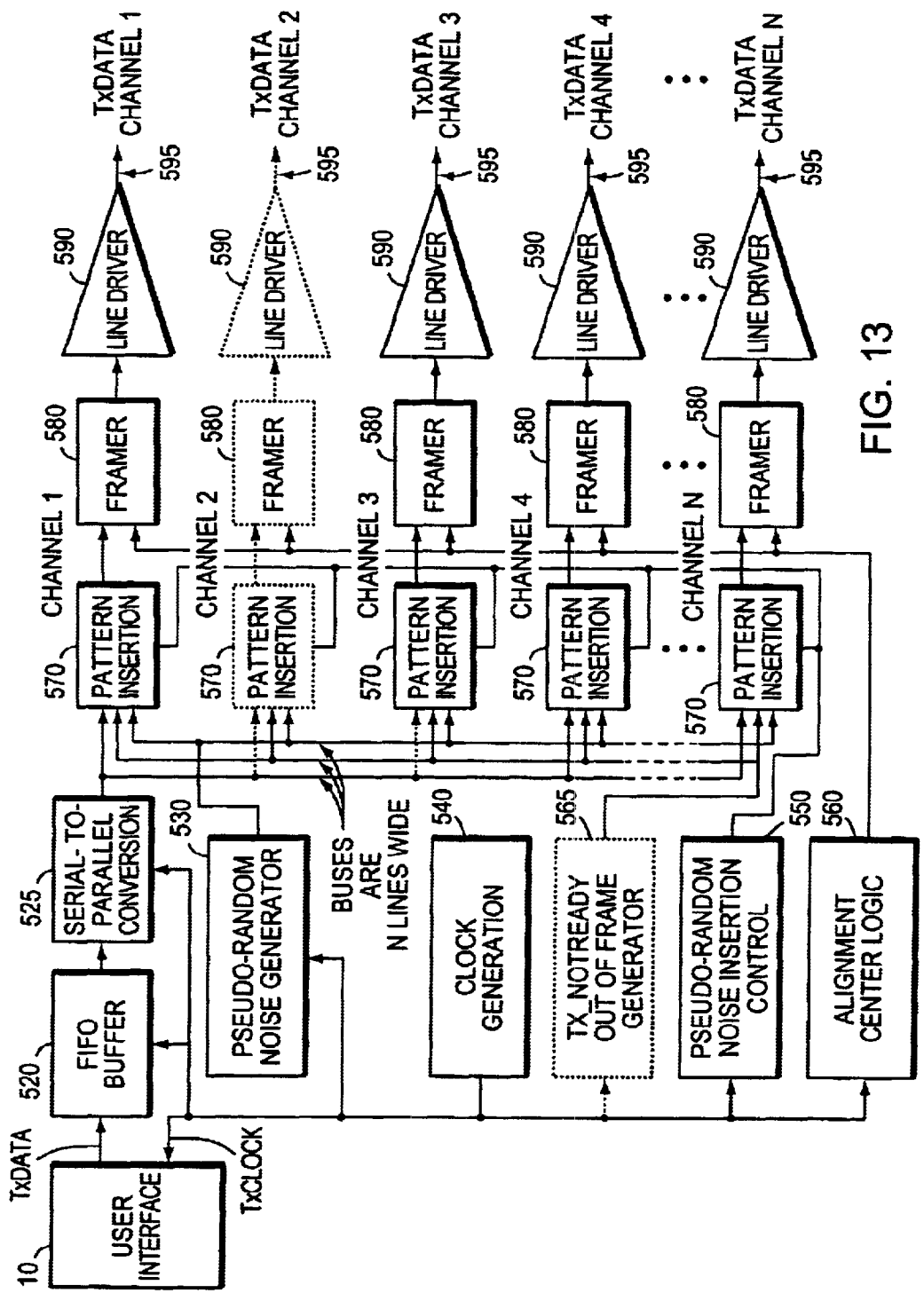
FIG. 13 shows the transmit disassembling process according to the present invention with a failure on channel 2.
Figure 14:
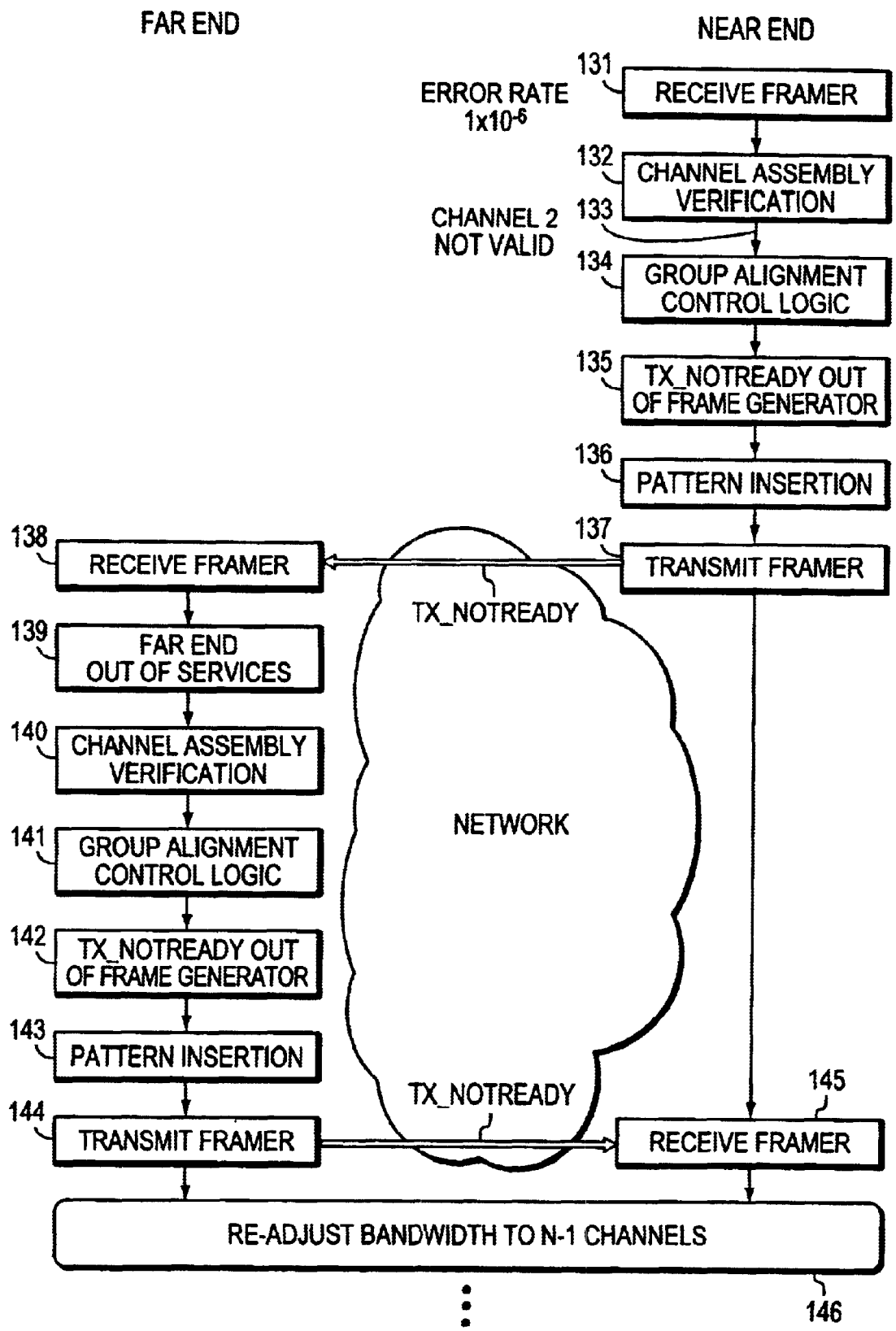
FIG. 14 shows a flow chart of the bandwidth adjustment process when the error rate exceeds a predefined threshold according to the present invention.

FIGS. 12 and 13 show respectively the receive reassembling and the transmit disassembling processes with a failure on a line (in the present example, channel 2 is out of service). The bandwidth adjustment process when the error rate exceeds a predefined threshold is detailed in FIG. 14.

When a local minor alarm condition such as Out Of Alignment, High Bit Error Rate, or the like occurs on a channel (step (131)) and is detected by a receiving end Framer (730), the receiving side (called the Near End in FIG. 14) first must fallback and re-cohere the received data to process only the N minus 1 good channels. Then, as shown in step (137) the near end multiplexer must send to the far end multiplexer (step (138)) a TX_NOTREADY: pattern to indicate that only N minus 1 channels have good data so that the far end multiplexer can also re-cohere the received data from the N minus 1 channels.

Step (132) shows that the Channel Assembly Verification (795) in the near end multiplexer receives an indication from the receiving end Framer (730) that one channel is no longer receiving good data.

Step (133) shows that the Group Alignment Control Logic (790) is informed that data received from Channel 2 (797) are no longer valid.

Steps (135) and (136) show that the Pattern Insertion unit (570) now inserts, on the failing channel, the TX_NOTREADY pattern generated by the Out-of-Frame Generator (565) in place of the pseudo-random noise alignment sequence (405).

In step (137), the TX_NOTREADY pattern informing that the channel is no longer usable is transmitted to the far end multiplexer via the Transmit Framer (580).

Once the TX_NOTREADY pattern is received in step (138), the far end multiplexer must fall back on that channel. It then returns, in step (144), the same TX_NOTREADY pattern (565) back to the near end multiplexer detection circuitry (745) (step (145)) indicating that it has also detected the error condition.

In step (139) the far end multiplexer receives the indication that the other end is out of service (745). In step (140) the Far End out of Service logic (745) then indicates to the Channel Assembly Verification (795) that only N minus 1 channels are currently receiving good data.

In step (141), the Group Alignment Control logic (790) receives this signal and sends a signal to the TX_NOTREADY Out of Frame Generator (565) (step (142)) indicating that one channel is not usable.

In step (143) the Pattern Insertion Unit (570) begins substituting the TX_NOTREADY signal in place of the pseudo-random noise alignment sequence (405).

Then in step (144) the Transmit Framer (590) transmits this indication to the near end multiplexer.

In step (145), the reception of the TX_NOTREADY pattern by the near end Framer (730) triggers a re-coherence procedure (step (146)) for the remaining N−1 physical lines.

Line Fallback

Once the TX_NOTREADY patterns have been exchanged over the failing channel between the far end and the near end multiplexers, the disassembly and reassembly processes described earlier are re-started. The re-coherence of the remaining channels does not include the failing channel previously detected and identified by the receiving end Framer (730). The Channel Assembly Verification unit (795) indicates to the Group Alignment Control Logic (790) the channels which are still valid (now N minus 1) by means of CHANNEL N VALID signals. (797). Then, the Group Alignment Control Logic performs the re-coherence of the N minus 1 channels. The TX_NOTREADY patterns (565) are sent until the fault condition is cleared at the near end multiplexer level (745). The sending of this signal is possible in channels which have have a high error rate but whose physical link between transmitting end and the receiving end has not been interrupted. If the physical link has been interrupted, then a major alarm has occurred.

The Channel Assembly Verification unit (795) receives indication about which channels are operational from the Far End Out-of-Service (745) logic. This information is passed to the Group Alignment Control Logic (790) by means of the CHANNEL N VALID signals (797).

Based on these signals the Group Alignment Control Logic (790) performs the re-coherence of the N minus 1 channels.

The data is reassembled by means of the Delay FIFO Buffers (750) and the Counters (760) into a serial data stream by the Parallel-to-Serial Conversion Unit (770).

This data stream is then sent to the HSSI User Interface (780).

Line Recovery

Figure 15:
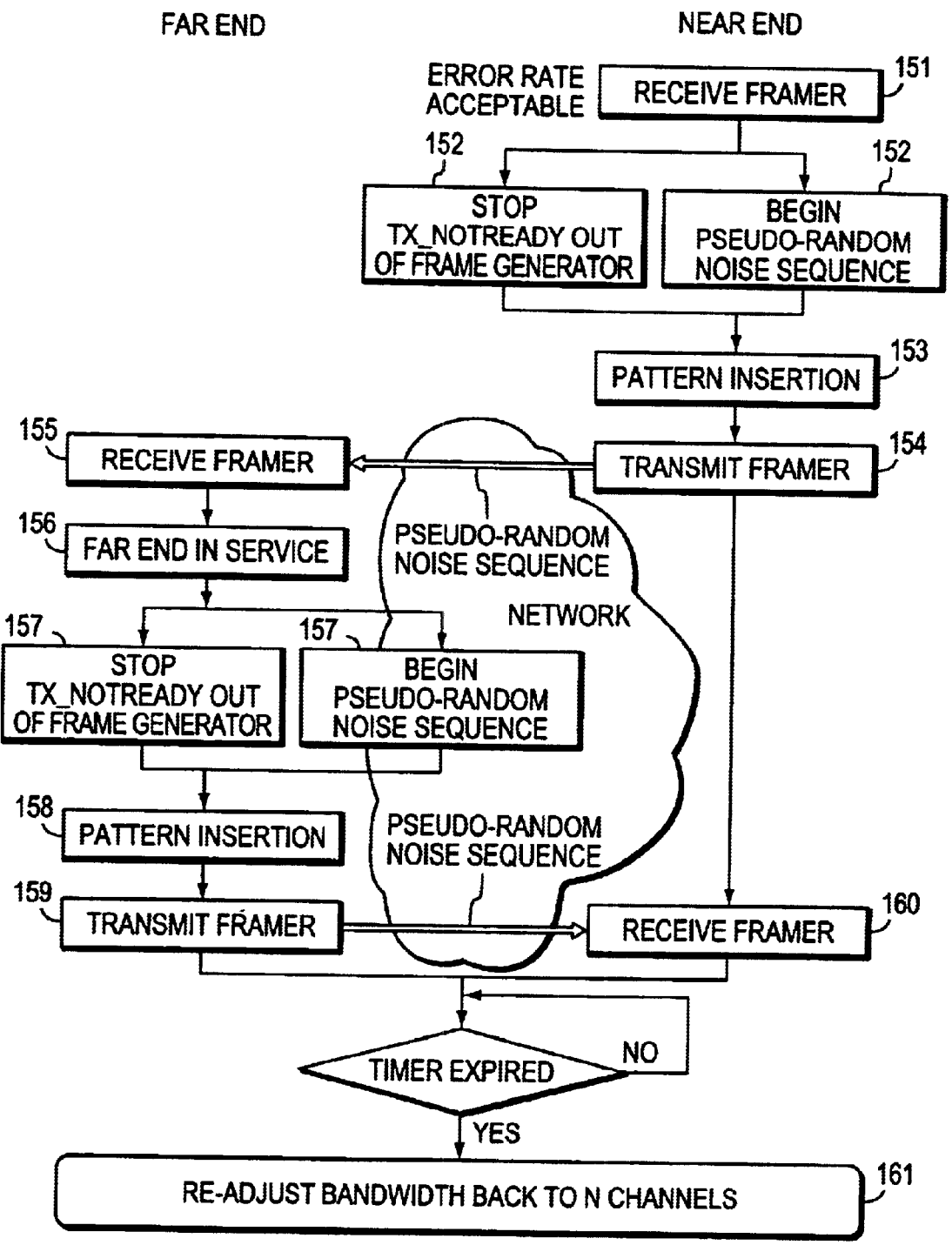
FIG. 15 shows a flow chart of the bandwidth adjustment process when a failed channel becomes usable.

When the faulty line is observed to be capable of going back into service because it is not longer out of alignment or the error rate is now within acceptable limits as defined by the customer, the re-coherence process restarts with N-lines and the line is restored. This procedure is shown in FIG. 15.

In step (151) the near end Receive Framer (730) detects that the error rate is at an acceptable level.

In step (152) the Out of Frame Generator (565) stops sending the TX_NOTREADY bit pattern.

In step (153) the Alignment Control Logic (560) directs the the Pattern Insertion logic (570) to start sending the pseudo-random noise bit pattern (405) under the control of the Pseudo Random Noise Insertion Control circuitry (550).

In step (154), the Pseudo-random Noise Sequence is then transmitted to the far end multiplexer by means of the Transmit Framer (590).

In step (155), the far end multiplexer (745) is informed that the near end multiplexer (565) is ready to restore the line.

In step (156), when the far end multiplexer reacquires frame alignment and synchronization via the normal pseudo-random noise sequence (740), the channel is declared in service.

In step (157), the far end multiplexer then stops sending the TX_NOTREADY signal (565) and starts sending a normal pseudo-random noise sequence (550).

In steps (158) and (159) the far end multiplexer transmits the pseudo-random noise sequence (405) to the near end multiplexer In step (160), once the near end multiplexer receives the normal pseudo-random noise sequence, (740), it restores the channel to service (step (161)).

The customer then has the option to re-cohere the channels into N-times the bandwidth or to continue to receive data on the N-1 channels. The indication that all channels are in service is given to the user by the RxREADY line (798) between the Group Alignment Control Logic (790) and the HSSI User Interface (780). This determination is made based on whether the failing channel is marginally good or whether the failed channel has been corrected.

Since the re-coherence process takes time, it is unwise to re-cohere for a marginally good channel. Therefore, a Timer (796) in step (162) is started once the channel becomes good. When the previously failed channel stays good for a certain period, for instance one second, then the N-1 channels are re-cohered into N channels of bandwidth. Expiration of the Timer (796) triggers a re-coherence procedure of the remaining N physical channels. This means that the disassembly and reassembly processes as described earlier are re-started.

Major Alarm

When the alarm condition requiring fallback is a major alarm (instead of a minor alarm), the fallback protocol is different.

Since end-to-end communication is no longer possible, a network alarm is sent by the network to both the far end and near end multiplexers. The network signals the alarm condition by placing certain CCITT standard bit sequences in the frame synchronization pattern (440) of the transmitted frame.

The network alarm is detected by the Framers (730) of the multiplexers at each end of the failed line.

The alarm is sent to the Channel Assembly Verification (795). The Channel N Valid signal (797) of the failing channel is removed and the Group Alignment Control Logic (790) at each end begins a re-coherence sequence.

When the alarm condition is cleared, the network stops sending the alarm, and restores the line.

The multiplexers at each end of the line do not see the alarm any more. They begin receiving the normal pseudo-random noise sequence (405) for that channel again and restore the line.

This fallback recovery protocol is managed by the local Channel Assembly Verification unit (795) and the Timer (796) which is configured to automatically restore the line to service as soon as said line is free of problems or at a selected time of day.

ADVANTAGES

The present invention allows telecommunication equipment to automatically adjust bandwidth based on the state of any or all of the physically separate lines used to transmit the higher bandwidth signal. In case of failure on a line, instead of losing N×line bandwidth, the user effectively still has N-1×line bandwidth available for his application. The present system and method disassembles the high speed user data to be transmitted on the lower speed physical telecommunications lines and then reassembles the data at the receiving end into a coherent high speed data stream by equalizing the delay across the multiple transmission paths. This system and method also monitors the state of each physically separate line. If one or multiple lines is defective or marginal in operation, this invention is able to automatically adjust the bandwidth to maximize the bandwidth on the number of remaining physical lines.

The present system and method of disassembling and reassembling is not limited to terrestrial transmission of signals but may also be employed in satellite communication systems, which must compensate and adjust the bandwidth for data streams travelling different physical routes through the network.

While there has been described what is considered to be a preferred embodiment of the invention, variations and modifications thereof may occur to those skilled in the art once they become familiar with the invention. Therefore, it is intended that the appended claims shall be construed to include both the preferred embodiment and all such variations and modifications as fall within the true spirit and scope of the invention.

What is claimed is:

1. For use in a communication network system for disassembling a relatively high bandwidth datastream into a plurality of relatively low bandwidth datastreams which are transmitted on a plurality of relatively low bandwidth channels, a method for dealing with a failure of one or more of the relatively low bandwidth channels, said method comprising:

transmitting in said relatively low bandwidth datastreams a selected sequence of bits as an alignment signal;

detecting said failure of one or more of the relatively low bandwidth channels;

replacing said selected sequence of bits with an alarm sequence of bits as a failure signal to indicate said failure; and, dividing, in response to said failure signal, said relatively high bandwidth datastream for transmission over said relatively low bandwidth channels that are not detected as failing.

2. The method according to claim 1 wherein the step of detecting said failure further comprises receiving a major alarm from at least one of the relatively low bandwidth channels detected as failing.

3. The method according to claim 1 or 2, further comprising:

detecting the current availability of a previously failed relatively low bandwidth channel; and allocating at least part of said relatively high bandwidth datastream to all available relatively low bandwidth channels, including said previously failed relatively low bandwidth channel.

4. For use in a communication network system for disassembling a relatively high bandwidth datastream into a plurality of relatively low bandwidth datastreams which are transmitted on a plurality of relatively low bandwidth channels, a method for dealing with a failure of one or more of the relatively low bandwidth channels, said method comprising:

detecting said failure of one or more of the relatively low bandwidth channels;

dividing said relatively high bandwidth datastream for transmission over said relatively low bandwidth channels that are not detected as failing;

receiving a minor alarm from said one or more relatively low bandwidth channels detected as failing;

inserting at least one bit of a failure signal in each of successive data frames of one or more relatively low bandwidth datastreams allocated to said one or more relatively low bandwidth channels detected as failing, consecutively inserted failure signal bits constituting a failure bit pattern recognizable at a receiving system; and transmitting said one or more relatively low bandwidth datastreams allocated to said one or more relatively low bandwidth channels with said inserted failure bit pattern.

5. A method for dealing with a failure of at least one of relatively low bandwidth channels, the method comprising:

transmitting a relatively high bandwidth datastream over a plurality of said relatively low bandwidth channels;

detecting said failure of at least one of said relatively low bandwidth channels;

dividing the relatively high bandwidth datastream for transmission over said relatively low bandwidth channels that are not detected as failing;

receiving an alarm from said relatively low bandwidth channels detected as failing;

inserting at least one bit of a failure signal in each of successive data frames of relatively low bandwidth datastreams allocated to said at least one of said low bandwidth channels detected as failing, consecutively inserted failure signal bits constituting a failure bit pattern recognizable at a receiving system; and transmitting said relatively low bandwidth datastreams allocated to said at least one of said low bandwidth channels detected as failing with the inserted failure bit pattern.

6. The method according to claim 4 or 5, further comprising:

concurrently inserting at least one bit of an alignment signal into corresponding data frames of each of said plurality of relatively low bandwidth datastreams, consecutively inserted alignment bits in said data frames constituting a predetermined alignment pattern; and replacing said alignment signal with said failure signal in successive data frames of said one or more relatively low bandwidth datastreams corresponding to said one or more relatively low bandwidth channels detected as failing.

7. For use at a receiving system in a communication network in which a plurality of relatively low bandwidth datastreams received on a plurality of relatively low bandwidth channels are to be reassembled into a relatively high bandwidth datastream, a reassembly method for dealing with a failure of one or more of the relatively low bandwidth channels, said method comprising:

receiving in said relatively low bandwidth datastreams a selected sequence of bits as an alignment signal;

receiving an alarm sequence of bits rather than said selected sequence of bits as at indication of said failure of one or more of said relatively low bandwidth channels; and, combining, in response to said indication of failure, said plurality of relatively low bandwidth datastreams received from said relatively low bandwidth channels that did not fail into a single relatively high bandwidth datastream.

8. The method according to claim 7 further comprising receiving a major alarm from at least one of the relatively low bandwidth channels that failed.

9. The method according to claim 7 or 8 further comprising:

detecting when a previously failing relatively low bandwidth channel is available again;

combining the plurality of relatively low bandwidth datastreams received from the plurality of relatively low bandwidth channels, including the previously failing relatively low bandwidth channel, into a single relatively high bandwidth datastream.

10. For use at a receiving system in a communication network in which a plurality of relatively low bandwidth datastreams received on a plurality of relatively low bandwidth channels are to be reassembled into a relatively high bandwidth datastream, a reassembly method for dealing with a failure of one or more of the relatively low bandwidth channels, said method comprising:

detecting a failure signal received on one or more of the plurality of relatively low bandwidth channels;

combining the plurality of relatively low bandwidth datastreams received from the relatively low bandwidth channels that did not fail into a single relatively high bandwidth datastream;

extracting failure signals inserted in data frames of a relatively low bandwidth datastream allocated to a failing relatively low bandwidth channel; and identifying the failing relatively low bandwidth channel by detecting a predetermined failure bit pattern formed from consecutive failure signals in said data frames of said failing relatively low bandwidth channel.

11. A reassembly method for dealing with a failure of one or more of relatively low bandwidth channels, the method comprising:

receiving a first relatively high bandwidth datastream transmitted over a plurality of said relatively low bandwidth channels;

detecting a failure signal received on one or more of said plurality of relatively low bandwidth channels;

combining a plurality of relatively low bandwidth datastreams received from said relatively low bandwidth channels on which said failure signal is not detected into a second relatively high bandwidth datastream;

extracting failure signals inserted in data frames of a relatively low bandwidth datastream allocated to a failing relatively low bandwidth channel; and identifying said failing relatively low bandwidth channel by detecting a predetermined failure bit pattern formed from failure signals in data frames of said failing relatively low bandwidth channel.

12. The method of claim 10 or 11 further comprising:

extracting an alignment signal inserted in each data frame of each of said relatively low bandwidth datastreams allocated to said relatively low bandwidth channels;

detecting a predetermined alignment pattern in each of said plurality of relatively low bandwidth datastreams, said predetermined alignment pattern being made up of consecutive alignment signals in data frames of each of said plurality of relatively low bandwidth datastreams; and extracting in place of the alignment signal, a failure signal inserted in a data frame of said relatively low bandwidth datastream originally allocated to said failing relatively low bandwidth channel.

13. The method according to claim 10 or 11 further comprising:

inserting said detected predetermined failure bit pattern into said data frames of said relatively low bandwidth datastream allocated to said failing relatively low bandwidth channel; and sending back said predetermined failure bit pattern over said failing relatively low bandwidth channel.

14. The method of claim 10 or 11 further comprising:

detecting in data frames of a relatively low bandwidth datastream corresponding to a previously failing relatively low bandwidth channel, replacement of the predetermined failure bit pattern with an alignment pattern inserted concurrently into each corresponding data frame of each of said relatively low bandwidth datastreams; and combining the plurality of relatively low bandwidth datastreams received from the relatively low bandwidth channels, including the previously failing relatively low bandwidth channel, into a single relatively high bandwidth datastream.

15. In a communication network system for disassembling a relatively high bandwidth datastream into a plurality of relatively low bandwidth datastreams which are transmitted on a plurality of relatively low bandwidth channels, a system for dealing with a failure of one or more of the relatively low bandwidth channels, said system comprising:

a line driver to transmit in said relatively low bandwidth datastreams a selected sequence of bits as an alignment signal;

a channel monitor for detecting said failure on one or more of the relatively low bandwidth channels;

logic to replace said selected sequence of bits with an alarm sequence of bits to indicate said failure; and logic responsive to said failure for dividing the relatively high bandwidth datastream for transmission over the relatively low bandwidth channels that are not detected as failing.

16. A receiving system in a communication network in which a plurality of relatively low bandwidth datastreams received on a plurality of relatively low bandwidth channels are to be reassembled into a relatively high bandwidth datastream, the system comprising:

a receiver to receive in said relatively low bandwidth datastreams a selected sequence of bits as an alignment signal;

logic to receive an alarm sequence of bits rather than said selected sequence of bits as a failure signal of a one of said relatively low bandwidth channels;

a channel monitor for detecting said failure signal received on one or more of the plurality of relatively low bandwidth channels; and logic for combining the plurality of relatively low bandwidth datastreams received from the relatively low bandwidth channels that did not fail into a single relatively high bandwidth datastream.

17. An apparatus to deal with a failure of at least one of relatively low bandwidth channels, comprising:

means for transmitting a high bandwidth datastream over a plurality of said relatively low bandwidth channels;

means for transmitting in said relatively low bandwidth channels a selected sequence of bits as an alignment signal;

means for detecting a failure on one or more of relatively low bandwidth channels;

means, responsive to said failure, for replacing said selected sequence of bits with an alarm sequence of bits as a failure signal to indicate the failure; and, means, responsive to said failure, for dividing the high bandwidth datastream for transmission over the low bandwidth channels that are not detected as failing.

18. The apparatus according to claim 17 wherein the means for detecting a failure further includes a means for receiving an alarm from at least one failing low bandwidth channel.

19. The apparatus according to claim 17 wherein data is transmitted as a series of data frames on the low bandwidth channels, said apparatus further comprising:

means for receiving an alarm from said failing low bandwidth channel;

means for inserting at least one bit of the failure signal in each of successive data frames of a relatively low bandwidth datastream allocated to the failing low bandwidth channel, consecutively inserted failure signal bits constituting a failure bit pattern recognizable at a receiving system; and means for transmitting the relatively low bandwidth datastream allocated to the failing low bandwidth channel with the inserted failure signal.

20. The apparatus according to claim 19 further comprising:

means for concurrently inserting at least one bit of an alignment signal into each corresponding data frame of each available relatively low bandwidth datastream, the consecutive alignment bits in data frames of each of said relatively low bandwidth datastreams constituting a predetermined alignment pattern; and means for replacing the alignment signal by a failure signal, in the data frames of the relatively low bandwidth datastream corresponding to a failing low bandwidth channel.

21. The apparatus according to claim 17 further comprising:

means for detecting the current availability of a previously failed low bandwidth channel; and means for allocating at least part of the relatively high bandwidth datastream to all available low bandwidth channels, including the previously failed low bandwidth channel.

22. A reassembly apparatus to deal with a failure of one or more of relatively low bandwidth channels adapted to communicate a plurality of relatively low bandwidth datastream, the apparatus comprising:

means for receiving a relatively high bandwidth datastream transmitted over a plurality of said relatively low bandwidth channels;

means for receiving in said relatively low bandwidth datastreams a selected sequence of bits as an alignment signal;

means for receiving an alarm sequence of bits rather than said selected sequence of bits as an indication of failure of a one of said relatively low bandwidth channels; and, means, responsive to said indication of failure, for combining into said relatively high bandwidth datastream the plurality of relatively low bandwidth datastreams received from the relatively low bandwidth channels that are not detected as failing.

23. The apparatus according to claim 22 further comprising means for receiving an alarm from the relatively low bandwidth channel detected as failing.

24. The apparatus according to claim 22, further comprising:

means for extracting failure signals inserted in data frames of the relatively low bandwidth datastream allocated to the relatively low bandwidth channel detected as failing; and means for identifying the relatively low bandwidth channel detected as failing by detecting a predetermined failure bit pattern formed from failure signals in said data frames.

25. The apparatus according to claim 24, further comprising:

means for extracting an alignment signal inserted in each data frame of each of relatively low bandwidth datastreams allocated to said relatively low bandwidth channels;

means for detecting a predetermined alignment pattern in each of said plurality of relatively low bandwidth datastreams, said predetermined alignment pattern being made up of consecutive alignment signals in data frames of each of said plurality of relatively low bandwidth datastreams; and means for extracting in place of the alignment signal, a failure signal inserted in a data frame of the relatively low bandwidth datastream originally allocated to said relatively low bandwidth channel detected as failing.

26. The apparatus according to claim 24, further comprising:

means for inserting said detected predetermined failure bit pattern into said data frames of said relatively low bandwidth datastream allocated to the relatively low bandwidth channel detected as failing; and means for sending back said predetermined failure bit pattern over the relatively low bandwidth channel detected as failing.

27. The apparatus according to claim 24, further comprising:

means for detecting in data frames of a relatively low bandwidth datastream corresponding to a relatively low bandwidth channel previously detected as failing replacement of the predetermined failure bit pattern with an alignment pattern inserted concurrently into each corresponding data frame of each of said relatively low bandwidth datastreams; and means for combining the plurality of relatively low bandwidth datastreams received from the relatively low bandwidth channels, including the relatively low bandwidth channel previously detected as failing, into a single relatively high bandwidth datastream.

28. The apparatus according to claim 22, further comprising:

means for detecting when the relatively low bandwidth channel previously detected as failing is available again; and means for combining the plurality of relatively low bandwidth datastreams received from the plurality of relatively low bandwidth channels, including the relatively low bandwidth channel previously detected as failing, into a single relatively high bandwidth datastream.

29. An apparatus to deal with a failure of at least one of relatively low bandwidth channels, comprising:

a transmitter to transmit a high bandwidth datastream over a plurality of said relatively low bandwidth channels;

a first process to transmit in said relatively low bandwidth channels a selected sequence of bits as an alignment signal;

a failure detection process for detecting a failure on one or more of relatively low bandwidth channels;

a second process, responsive to said failure, to replace said selected sequence of bits with an alarm sequence of bits as a failure signal to indicate the failure; and, a dividing process for dividing, in response to said failure, the high bandwidth datastream for transmission over the low bandwidth channels that are not detected as failing.

30. The apparatus according to claim 29 wherein the failure detection process further includes an alarm process for receiving an alarm from at least one failing low bandwidth channel.

31. The apparatus according to claim 29 wherein data is transmitted as a series of data frames on the low bandwidth channels, said apparatus further comprising:

an alarm process for receiving an alarm from said failing low bandwidth channel;

a failure bit insertion process for inserting at least one bit of failure signal in each of successive data frames of the relatively low bandwidth datastream allocated to the failing low bandwidth channel, failure signal bits constituting a failure bit pattern recognizable at a receiving system; and a failing channel transmission process for transmitting the relatively low bandwidth datastream allocated to the failing low bandwidth channel with the inserted failure bit pattern.

32. The apparatus according to claim 31 further comprising:

an alignment bit process for concurrently inserting at least one bit of an alignment signal into each corresponding data frame of each available relatively low bandwidth datastream, the consecutive alignment bits in data frames of each of said relatively low bandwidth datastreams constituting a predetermined alignment pattern; and a replacing process for replacing the alignment signal by a failure signal, in the data frames of the relatively low bandwidth datastream corresponding to a failing low bandwidth channel.

33. The apparatus according to claim 29 further comprising:

an availability detection process for detecting the current availability of a previously failed low bandwidth channel; and a failed channel allocation process for allocating at least part of the relatively high bandwidth datastream to all available low bandwidth channels, including the previously failed low bandwidth channel.

34. A reassembly apparatus to deal with a failure of one or more of relatively low bandwidth channels comprising:

a receiver to receive a high bandwidth datastream transmitted over a plurality of said relatively low bandwidth channels;

a first logic to receive in said plurality of relatively low bandwidth channels a selected sequence of bits as an alignment signal;

a second logic to detect an alarm sequence of bits in place of said selected sequence of bits as a failure signal to indicate the failure; and a combining process, responsive to said failure, for combining into a single high bandwidth datastream the plurality of low bandwidth datastreams received from the low bandwidth channels that are not detected as failing.

35. The apparatus according to claim 34 wherein the failure signal process further includes an alarm process for receiving an alarm from at least one failing low bandwidth channel.

36. The apparatus according to claim 34 further comprising:

an extraction process for extracting failure signals inserted in the data frames of a relatively low bandwidth datastream allocated to a failing low bandwidth channel; and a failing channel identification process for identifying the failing low bandwidth channel by detecting a predetermined failure bit pattern formed from failure signals in the data frames of said failing low bandwidth channel.

37. The apparatus according to claim 36 further comprising:
- an extraction process for extracting an alignment signal inserted in each data frame of each of relatively low bandwidth datastreams allocated to available low bandwidth channels;
- an alignment pattern detection process for detecting a predetermined alignment pattern in each of said plurality of relatively low bandwidth datastreams allocated to available, low bandwidth channels, said predetermined alignment pattern being made up of consecutive alignment signals in data frames of each of said plurality of low bandwidth datastreams; and
- a failure signal extraction process for extracting, in place of the alignment signal, a failure signal inserted in a data frame of the relatively low bandwidth datastream originally allocated to the failing low bandwidth channel.

38. The apparatus according to claim 36 characterized in that the failing channel identification process further comprises:
- a failure pattern insertion process for inserting the predetermined failure pattern previously detected into the data frames of the relatively low bandwidth datastream corresponding to the failing channel; and
- a failure pattern return process for sending back said failure pattern over the failing low bandwidth channel.

39. The apparatus according to claim 36 further comprising:
- an alignment pattern detection process for detecting, in the data frames of the relatively low bandwidth datastream corresponding to the previously failing channel, the replacement of the failure pattern by the alignment pattern inserted concurrently into each corresponding data frame of each of said low bandwidth datastreams; and
- a datastream combining process for combining the plurality of low bandwidth datastreams received from the available low bandwidth channels, including the previously failing channel, into a single high bandwidth datastream.

40. The apparatus according to claim 34 further comprising:
- a channel availability detection process for detecting when the previously failing channel is available again; and
- a datastream combining process for combining the plurality of low bandwidth datastreams received from the available low bandwidth channels, including the previously failing channel, into a single high bandwidth datastream.

41. A computer readable media, the computer readable media having written thereon information for execution in a processor for the practice of a reassembly method for dealing with a failure of one or more of relatively low bandwidth channels, comprising:
- receiving a high bandwidth datastream transmitted over a plurality of said relatively low bandwidths channels;
- detecting a failure signal received on one or more of the plurality of relatively low bandwidth channels;
- combining the plurality of low bandwidth datastreams received from the remaining available low bandwidth channels into a single high bandwidth datastream;
- extracting failure signals inserted in the data frames of a relatively low bandwidth datastream allocated to a failing low bandwidth channel; and
- identifying the failing low bandwidth channel by detecting a predetermined failure bit pattern formed from failure signals in the data frames of said failing low bandwidth channel.

* * * * *